United States Patent
Deenoo et al.

(10) Patent No.: US 12,382,542 B2
(45) Date of Patent: *Aug. 5, 2025

(54) METHOD AND APPARATUS FOR ACCESSING A WIRELESS NETWORK

(71) Applicant: InterDigital Patent Holdings, Inc., Wilmington, DE (US)

(72) Inventors: Yugeswar Deenoo, Chalfont, PA (US); Ghyslain Pelletier, Montreal (CA); J. Patrick Tooher, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/395,818

(22) Filed: Dec. 26, 2023

(65) Prior Publication Data

US 2024/0188139 A1    Jun. 6, 2024

Related U.S. Application Data

(63) Continuation of application No. 17/699,929, filed on Mar. 21, 2022, now Pat. No. 11,856,614, which is a
(Continued)

(51) Int. Cl.
*H04W 74/0833* (2024.01)
*H04L 5/00* (2006.01)
(Continued)

(52) U.S. Cl.
CPC ... *H04W 74/0833* (2013.01); *H04W 72/0446* (2013.01); *H04W 72/0453* (2013.01);
(Continued)

(58) Field of Classification Search
CPC ......... H04W 74/0833; H04W 72/0446; H04W 72/0453; H04W 76/28; H04L 5/0007
See application file for complete search history.

(56) References Cited

U.S. PATENT DOCUMENTS

| 9,603,048 B2 | 3/2017 | Pelletier et al. |
| 10,299,275 B2 | 5/2019 | Hou et al. |
| (Continued) | | |

FOREIGN PATENT DOCUMENTS

| CN | 101669336 A | 3/2010 |
| CN | 102138361 A | 7/2011 |
| (Continued) | | |

OTHER PUBLICATIONS

CATT, "Consideration on higher layer procedures in 5G NR," 3GPP TSG-RAN WG2 Meeting #93bis, R2-162568, Dubrovnik, Croatia (Apr. 11-15, 2016).

(Continued)

*Primary Examiner* — Mohammad S Anwar
(74) *Attorney, Agent, or Firm* — VOLPE KOENIG

(57) ABSTRACT

Methods and apparatuses for accessing a wireless network are provided herein. A method according to at least one embodiment includes receiving a transmission including system information indicating a random access channel (RACH) configuration. The RACH configuration may indicate one or more RACH occasions and one or more preambles, each of the RACH occasions associated with at least one of the one or more preambles. The method may include receiving one or more reference signals and transmitting one of the preambles in a RACH occasion that is associated with the transmitted preamble. The transmitted preamble may be selected for transmission based on a measurement of the received one or more reference signals, and wherein the transmitted preamble is transmitted using beamforming parameters derived based on the received one or more reference signals.

20 Claims, 10 Drawing Sheets

Related U.S. Application Data continuation of application No. 16/818,093, filed on Mar. 13, 2020, now Pat. No. 11,284,445, which is a continuation of application No. 16/086,880, filed as application No. PCT/US2017/024966 on Mar. 30, 2017, now abandoned.

(60) Provisional application No. 62/315,458, filed on Mar. 30, 2016.

(51) Int. Cl.
| | | |
|---|---|---|
| H04W 4/70 | (2018.01) | |
| H04W 48/08 | (2009.01) | |
| H04W 72/0446 | (2023.01) | |
| H04W 72/0453 | (2023.01) | |
| H04W 74/00 | (2009.01) | |
| H04W 76/28 | (2018.01) | |

(52) U.S. Cl.
CPC .......... *H04W 76/28* (2018.02); *H04L 5/0007* (2013.01); *H04W 4/70* (2018.02); *H04W 48/08* (2013.01); *H04W 74/006* (2013.01)

(56) References Cited

U.S. PATENT DOCUMENTS

| | | | |
|---|---|---|---|
| 11,140,608 | B2 | 10/2021 | Wang et al. |
| 11,856,614 | B2* | 12/2023 | Deenoo ............. H04W 72/0453 |
| 2004/0002364 | A1 | 1/2004 | Trikkonen et al. |
| 2007/0165567 | A1 | 7/2007 | Tan et al. |
| 2012/0071200 | A1 | 3/2012 | Bienas et al. |
| 2012/0079559 | A1 | 3/2012 | Reznik et al. |
| 2012/0113938 | A1 | 5/2012 | Larsson et al. |
| 2013/0188582 | A1 | 7/2013 | Dinan |
| 2014/0241242 | A1 | 8/2014 | Josiam et al. |
| 2014/0295836 | A1 | 10/2014 | Frenger et al. |
| 2015/0016312 | A1 | 1/2015 | Li et al. |
| 2015/0043445 | A1 | 2/2015 | Xiong et al. |
| 2015/0049741 | A1 | 2/2015 | Chen et al. |
| 2015/0256995 | A1 | 9/2015 | Rune et al. |
| 2016/0029358 | A1 | 1/2016 | Hou et al. |
| 2016/0073292 | A1 | 3/2016 | Fan et al. |
| 2016/0192278 | A1 | 6/2016 | Ji et al. |
| 2016/0227575 | A1 | 8/2016 | Furuskog et al. |
| 2016/0270038 | A1 | 9/2016 | Papasakellariou |
| 2016/0302234 | A1 | 10/2016 | Martinez Tarradell et al. |
| 2016/0353453 | A1 | 12/2016 | Au et al. |
| 2017/0111930 | A1 | 4/2017 | Rajagopal et al. |
| 2017/0201968 | A1 | 7/2017 | Nam et al. |

FOREIGN PATENT DOCUMENTS

| | | |
|---|---|---|
| CN | 103155669 A | 6/2013 |
| CN | 104471503 A | 3/2015 |
| EP | 2 124 362 | 11/2009 |
| EP | 2 887 561 | 6/2015 |
| WO | 2013/112952 | 8/2013 |
| WO | 2015/147717 | 10/2015 |
| WO | 2016/127392 | 8/2016 |

OTHER PUBLICATIONS

Ericsson, "Index based provisioning of system information in NR," 3GPP TSG-RAN WG2 #95, R2-165550, Gothenburg, Sweden (Aug. 22-26, 2016).

Interdigital Communications, "System Information Acquisition for New Radio Access," 3GPP TSG- RAN WG2 #94, R2-164088, Nanjing, China (May 23-27, 2016).

Interdigital Communications, "System Information Acquisition for New Radio Access," 3GPP TSG-RAN WG2 #95, R2-165047, Gothenburg, Sweden (Aug. 22-26, 2016).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.2.0 (Dec. 2015).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.7.0 (Mar. 2017).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.1.0 (Dec. 2016).

Third Generation Partnership Project, "Technical Specification Group Radio Access Network; Evolved Universal Terrestrial Radio Access (E-UTRA); Physical layer procedures (Release 13)," 3GPP TS 36.213 V13.1.0 (Mar. 2016).

Third Generation Partnership Project, "Technical Specification Group Radio Access Network; Evolved Universal Terrestrial Radio Access (E-UTRA); Physical layer procedures (Release 13)," 3GPP TS 36.213 V13.5.0 (Mar. 2017).

Third Generation Partnership Project, "Technical Specification Group Radio Access Network; Evolved Universal Terrestrial Radio Access (E-UTRA); Physical layer procedures (Release 14)," 3GPP TS 36.213 V14.2.0 (Mar. 2017).

Third Generation Partnership Project, "Technical Specification Group Radio Access Network; Evolved Universal Terrestrial Radio Access (E-UTRA); Medium Access Control (MAC) protocol specification (Release 13)," 3GPP TS 36.321 V13.0.0 (Dec. 2015).

Third Generation Partnership Project, "Technical Specification Group Radio Access Network; Evolved Universal Terrestrial Radio Access (E-UTRA); Medium Access Control (MAC) protocol specification (Release 13)," 3GPP TS 36.321 V13.5.0 (Mar. 2017).

Third Generation Partnership Project, "Technical Specification Group Radio Access Network; Evolved Universal Terrestrial Radio Access (E-UTRA); Medium Access Control (MAC) protocol specification (Release 14)," 3GPP TS 36.321 V14.2.0 (Mar. 2017).

Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V13.0.0 (Dec. 2015).

Third Generation Partnership Project, "Technical Specification Group Radio Access Network; Evolved Universal Terrestrial Radio Access (E-UTRA); Radio Resource Control (RRC); Protocol specification (Release 13)," 3GPP TS 36.331 V13.5.0 (Mar. 2017).

Third Generation Partnership Project, "Technical Specification Group Radio Access Network; Evolved Universal Terrestrial Radio Access (E-UTRA); Radio Resource Control (RRC); Protocol specification (Release 14)," 3GPP TS 36.331 V14.2.0 (Mar. 2017).

Third Generation Partnership Project, "Technical Specification Group Radio Access Network; Evolved Universal Terrestrial Radio Access (E-UTRA); Physical channels and modulation (Release 13)," 3GPP TS 36.211 V13.1.0 (Mar. 2016).

Third Generation Partnership Project, "Technical Specification Group Radio Access Network; Evolved Universal Terrestrial Radio Access (E-UTRA); Physical channels and modulation (Release 13)," 3GPP TS 36.211 V13.5.0 (Mar. 2017).

Third Generation Partnership Project, "Technical Specification Group Radio Access Network; Evolved Universal Terrestrial Radio Access (E-UTRA); Physical channels and modulation (Release 14)," 3GPP TS 36.211 V14.1.0 (Dec. 2016).

Third Generation Partnership Project, "Technical Specification Group Radio Access Network; Evolved Universal Terrestrial Radio Access (E-UTRA); Physical layer; Measurements (Release 13)," 3GPP TS 36.214 V13.1.0 (Mar. 2016).

Third Generation Partnership Project, "Technical Specification Group Radio Access Network; Evolved Universal Terrestrial Radio Access (E-UTRA); Physical layer; Measurements (Release 13)," 3GPP TS 36.214 V13.4.0 (Dec. 2016).

(56) References Cited

OTHER PUBLICATIONS

ZTE, "Consideration on System Information Broadcast in New RAT," 3GPP TSG-RAN WG2 Meeting #93bis, R2-162629, Dubrovnik, Croatia (Apr. 11-15, 2016).

* cited by examiner

METHOD AND APPARATUS FOR ACCESSING A WIRELESS NETWORK

CROSS REFERENCE TO RELATED APPLICATIONS

This application is a continuation of U.S. patent Ser. No. 17/699,929 filed on Mar. 21, 2022, which issued as U.S. Pat. No. 11,856,614 on Dec. 26, 2023, which is a continuation of U.S. patent application Ser. No. 16/818,093 filed on Mar. 13, 2020, which issued as U.S. Pat. No. 11,284,445 on Mar. 22, 2022, which is a continuation of U.S. patent application Ser. No. 16/086,880, filed Sep. 20, 2018, which is the U.S. National Stage, under 35 U.S.C. § 371, of International Application No. PCT/US2017/024966, filed Mar. 30, 2017, which claims the benefit of Provisional Application No. 62/315,458, filed Mar. 30, 2016, the contents of which are incorporated herein by reference.

BACKGROUND

Mobile communications are in continuous evolution and are at the doorstep of its fifth incarnation, 5G. As with previous generations, new use cases largely contributed in setting the requirements for the new system. The 5G air interface may at least enable the following use cases: improved broadband performance (IBB); industrial control and communications (ICC) and vehicular applications (V2X); and massive machine-type communications (mMTC).

The above uses cases may be translated into the following requirements for the 5G interface: support for ultra-low transmission latency (LLC); support for ultra-reliable transmission (URC); and support for MTC operation (including narrowband operation).

One of the goals for the next generation radio access technology is to achieve improved energy efficiency. Energy consumption in the radio access network is dominated by always-on broadcast signaling.

SUMMARY

Methods and apparatuses for accessing a wireless network are described herein. A method according to at least one embodiment may include receiving a transmission including information associated with a plurality of random access channel (RACH) configurations. The information may indicate a plurality of RACH occasions in which a preamble transmission may be sent. One or more reference signals may be received. Methods may further include sending, using one of the plurality of RACH configurations, the preamble transmission in one of the plurality of RACH occasions along with one or more protocol data units (PDUs). The one of the plurality of RACH configurations may be selected based on a measurement of at least one of the one or more received reference signals. The method may further include sending, in response to the preamble transmission and the one or more PDUs, a random access response.

BRIEF DESCRIPTION OF THE DRAWINGS

A more detailed understanding may be had from the following description, given by way of example in conjunction with the accompanying drawings wherein.

DETAILED DESCRIPTION

Figure 1A:
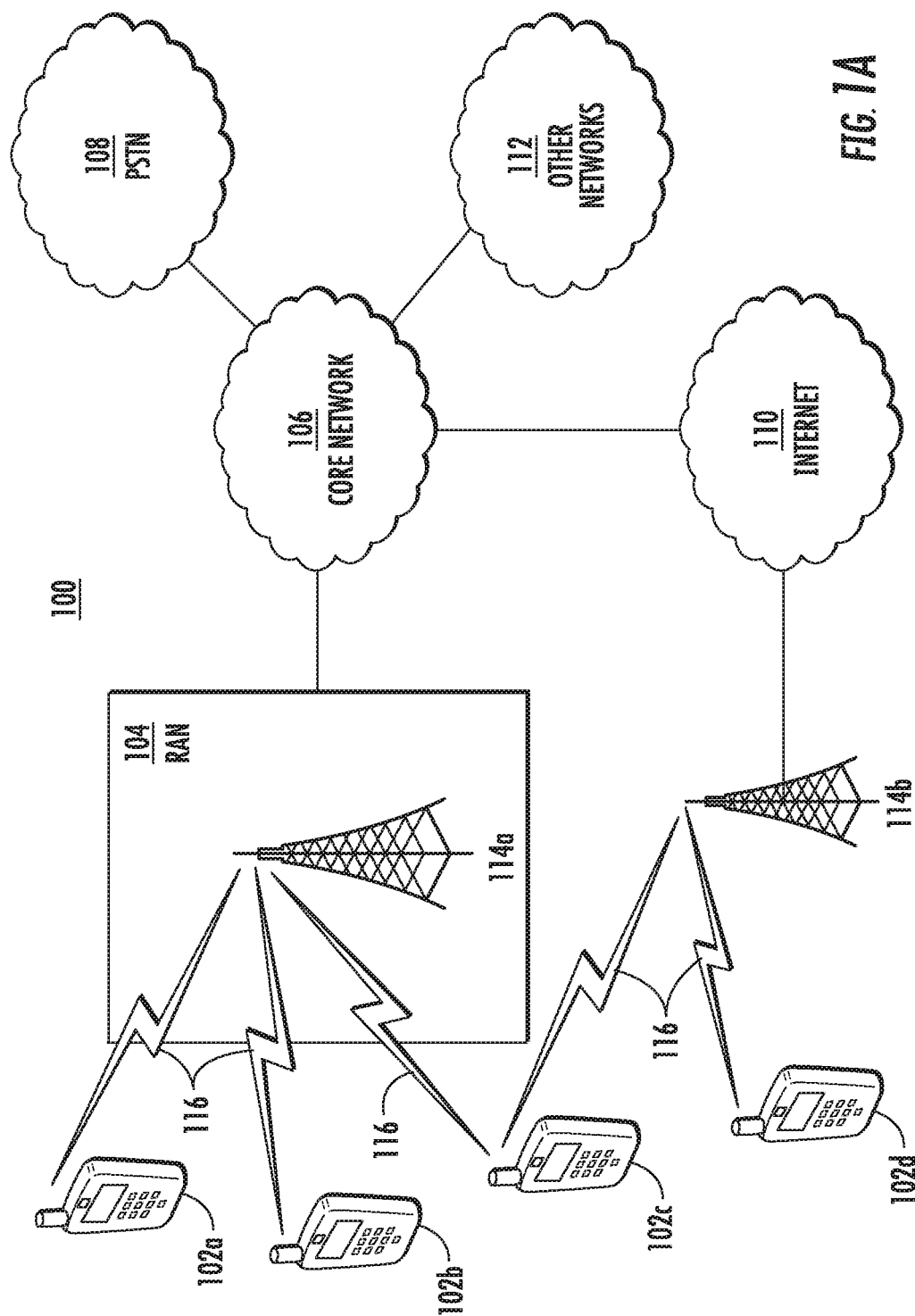
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNodeB (eNB), a Home Node B, a Home eNodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as Institute for Electrical and Electronics Engineers (IEEE) 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNodeB, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers, transmitters, or receivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
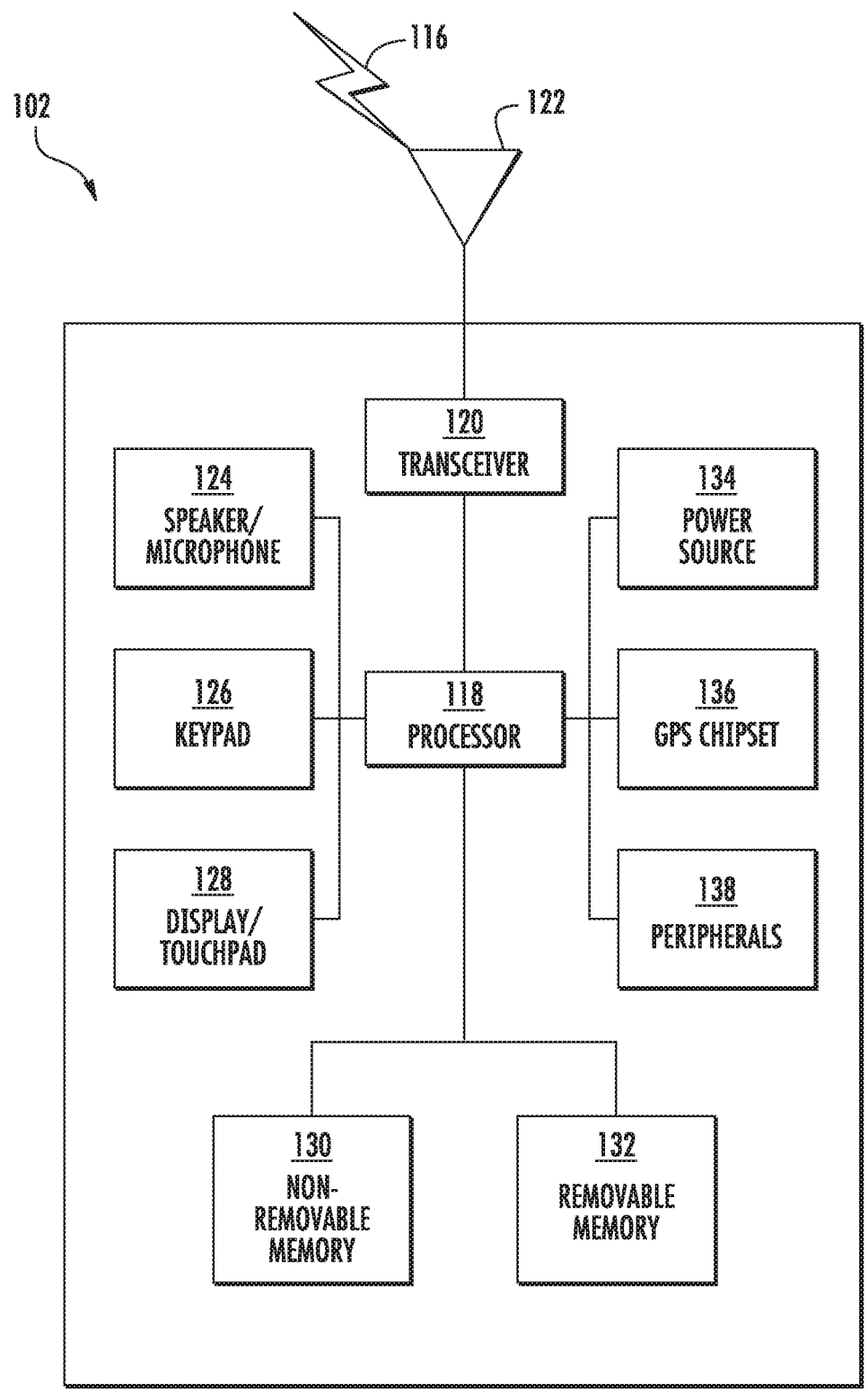
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 and the removable memory 132 may include any volatile or non-volatile read/write memory. The non-removable memory 130 may include random-access memory (RAM), read-only memory (ROM), a hard disk, or any other type of memory storage device. The removable memory 132 may include but is not limited to a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown). The processor 118 may access information from, and store data in, an access table stored in any type of suitable memory, such as the non-removable memory 130 and/or the removable memory 132. The access table that is stored in any type of suitable memory, such as the non-removable memory 130 and/or the removable memory 132, may be received from communication networks, such as the core network 106, the Internet 110, and/or the other networks 112, or any of the 3GPP or 5G network entities described herein.

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
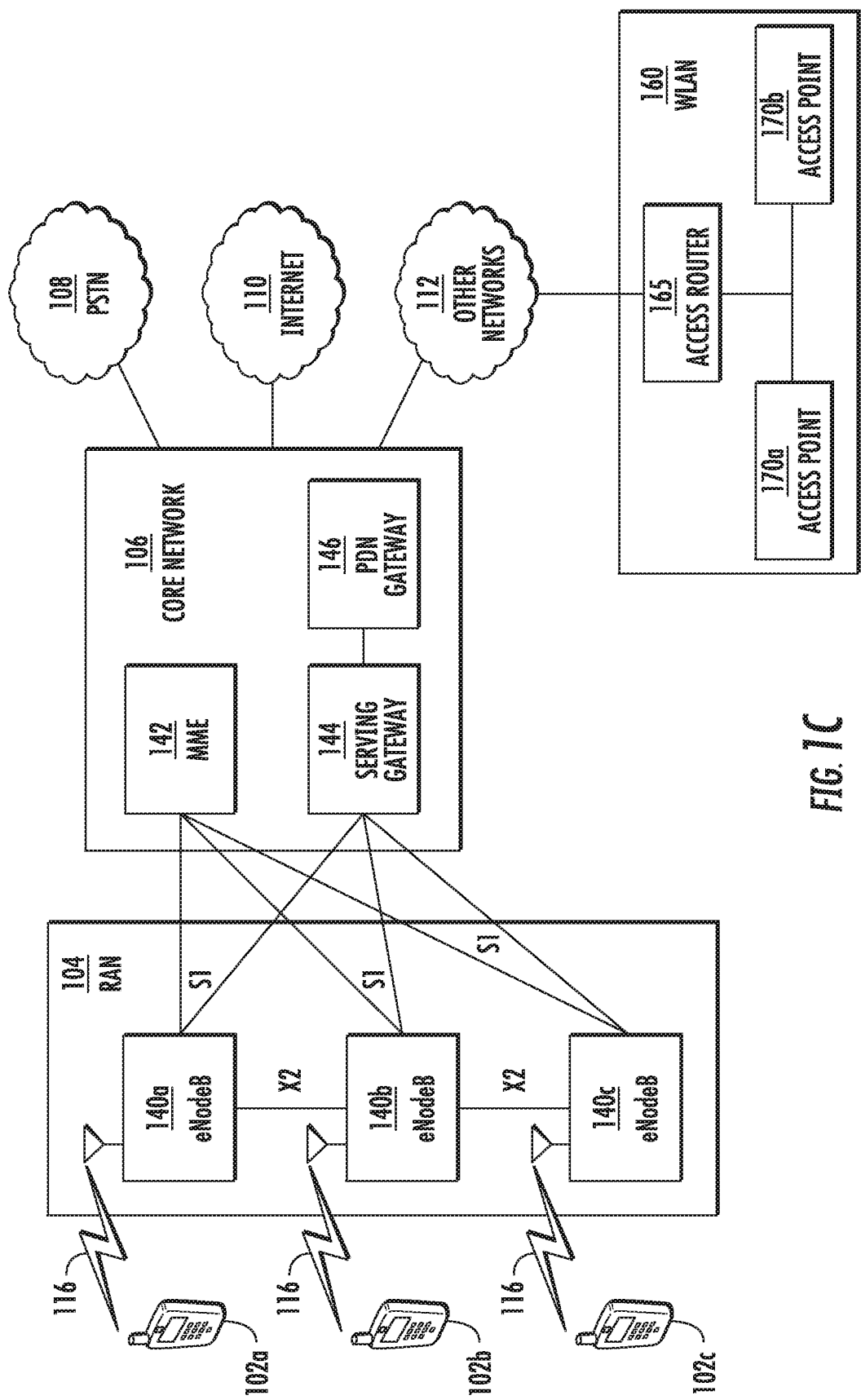
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNodeBs (eNBs) 140a, 140b, 140c, though it will be appreciated that the RAN 104 may include any number of eNodeBs while remaining consistent with an embodiment. The eNodeBs 140a, 140b, 140c may each include one or more transceivers for communicating with the WTRUs 102a, 102b, 102c over the air interface 116. In one embodiment, the eNodeBs 140a, 140b, 140c may implement MIMO technology. Thus, the eNodeB 140a, for example, may use multiple antennas to transmit wireless signals to, and receive wireless signals from, the WTRU 102a.

Each of the eNodeBs 140a, 140b, 140c may be associated with a particular cell (not shown) and may be configured to handle radio resource management decisions, handover decisions, scheduling of users in the uplink and/or downlink, and the like. As shown in FIG. 1C, the eNodeBs 140a, 140b, 140c may communicate with one another over an X2 interface.

The core network 106 shown in FIG. 1C may include a mobility management entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNodeBs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNodeBs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNodeB handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with various networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the various networks including the PSTN 108, Internet 110, and other networks 112, which may include other wired or wireless networks that are owned and/or operated by other service providers.

Other networks 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

Although the embodiments described herein consider 3GPP specific protocols, the embodiments described herein are not restricted to a 3GPP system and are applicable to other wireless systems.

While not intending to limit the applicability to other meanings and/or other type of signals, configuration methods, or logical associations between different user data units, the following definitions and terms are used herein in support for the description of the various methods.

The following abbreviations and acronyms are provided to aid and enhance the understanding of the embodiments described herein.

Δf Sub-carrier spacing
5gFlex 5G Flexible Radio Access Technology
5gNB 5GFlex NodeB
ACK Acknowledgement
BLER Block Error Rate
BTI Basic TI (in integer multiple of one or more symbol duration)
CB Contention-Based (e.g., access, channel, resource)
CoMP Coordinated Multi-Point transmission/reception
CP Cyclic Prefix
CP-OFDM Conventional OFDM (relying on cyclic prefix)
CQ Channel Quality Indicator
CN Core Network (e.g., LTE packet core)
CRC Cyclic Redundancy Check
CSG Closed Subscriber Group
CSI Channel State Information
D2D Device to Device transmissions (e.g., LTE Sidelink)
DCI Downlink Control Information
DL Downlink
DM-RS Demodulation Reference Signal
DRB Data Radio Bearer
EPC Evolved Packet Core
FBMC Filtered Band Multi-Carrier
FBMC/OQAM A FBMC technique using Offset Quadrature Amplitude Modulation
FDD Frequency Division Duplexing
FDM Frequency Division Multiplexing
ICC Industrial Control and Communications
ICIC Inter-Cell Interference Cancellation
IP Internet Protocol
LAA License Assisted Access
LBT Listen-Before-Talk
LCH Logical Channel
LCP Logical Channel Prioritization
LLC Low Latency Communications
LTE Long Term Evolution e.g., from 3GPP LTE R8 and up
MAC Medium Access Control
NACK Negative ACK
MC MultiCarrier
MCS Modulation and Coding Scheme
MIMO Multiple Input Multiple Output
MTC Machine-Type Communications
NAS Non-Access Stratum
OFDM Orthogonal Frequency-Division Multiplexing
OOB Out-Of-Band (emissions)
Pcmax Total available WTRU power in a given TI
PHY Physical Layer
PRACH Physical Random Access Channel
PDU Protocol Data Unit
PER Packet Error Rate
PLMN Public Land Mobile Network
PLR Packet Loss Rate
PSS Primary Synchronization Signal
QoS Quality of Service (from the physical layer perspective)
RAB Radio Access Bearer
RACH Random Access Channel (or procedure)
RAR Random Access Response
RCU Radio access network Central Unit
RF Radio Front end RNTI Radio Network Identifier
RRC Radio Resource Control
RRM Radio Resource Management
RS Reference Signal
RTT Round-Trip Time
SCMA Single Carrier Multiple Access
SDU Service Data Unit
SOM Spectrum Operation Mode
SS Synchronization Signal
SSS Secondary Synchronization Signal
SRB Signaling Radio Bearer
SWG Switching Gap (in a self-contained subframe)
TB Transport Block
TBS Transport Block Size
TDD Time-Division Duplexing
TDM Time-Division Multiplexing
TI Time Interval (in integer multiple of one or more BTI)
TTI Transmission Time Interval (in integer multiple of one or more TI)
TRP Transmission/Reception Point
TRPG Transmission/Reception Point Group
TRx Transceiver
UFMC Universal Filtered MultiCarrier
UF-OFDM Universal Filtered OFDM
UL Uplink
URC Ultra-Reliable Communications
URLLC Ultra-Reliable and Low Latency Communications
V2V Vehicle to vehicle communications
V2X Vehicular communications
WLAN Wireless Local Area Networks and related technologies (IEEE 802.xx domain)

One of the goals for next generation radio access technology such as 5gFLEX is to achieve improved energy efficiency. Energy consumption in the radio access network may be due to always-on broadcast signaling. Reducing mandatory periodic transmissions that are not directly related to user data transmission is one solution provided by the embodiments described herein.

Next generation radio access technology such as 5gFLEX is also expected to support diverse sets of services in the same spectrum. Legacy LTE systems may define one initial access method for example, random access, but in 5G diverse sets of access methods may be used to handle different use cases including but not limited to enhanced mobile broadband (eMBB), mMTC, and URLLC. Mechanisms to handle a diverse set of access methods is another solution provided by the embodiments described herein.

The embodiments described herein may be used in deployment scenarios including but not limited to (1) LTE-assisted 5gFLEX Aggregation (DC/CA/Offload), (2) LTE-assisted 5gFLEX Transport Channel(s) (which includes for example, LTE CP, LTE UP, LTE Uu with one or more 5gFLEX TrCH/Physical channels plugged into LTE Uu), LTE-based Stand-alone 5gFLEX operation (which includes for example, LTE CP, LTE L2 at least in part, 5gFLEX PHY), and (3) Stand-alone 5gFLEX operation.

For LTE-assisted 5gFLEX Aggregation (DC/CA/Offload), the WTRU may be configured using the LTE Control Plane, for example with a LTE RRC connection, and using the LTE User Plane, for example with one or more LTE Uu interfaces. The WTRU may further be configured to operate with one or more additional 5gFLEX Uu(s) using the principles of LTE DC, LTE CA or LTE-WLAN offload. This configuration may be performed by reception of access table(s) from broadcast or dedicated signaling. Triggers for initial access to 5gFLEX PHY may use similar triggers as for LTE CA/DC/Offload or other types of triggers.

For LTE-assisted 5gFLEX Transport Channel(s) (which includes for example, LTE CP, LTE UP, LTE Uu with one or more 5gFLEX TrCH/Physical channels plugged into LTE Uu), the WTRU may be configured for LTE Uu operation using legacy methods. The WTRU may be further configured with one or more physical layer (control and/or data) channels for a 5gFLEX Uu of the configuration of the WTRU. The downlink physical channels may co-exist in the DL carrier and/or frequency band while the UL carrier may also be common or separate (e.g., for uplink control channels). From the perspective of the WTRU configured with one or more 5gFLEX physical channels, the cell-specific LTE signals/channels may be viewed as holes in the 5gFLEX map of physical layer resources. Triggers for initial access to 5gFLEX PHY may use similar triggers as for LTE DL data arrival and/or LTE UL data arrival or other triggers as 5G transmission/reception points (TRPs) may not necessarily be collocated with the LTE eNB (e.g., 5G RRHs).

For LTE-based Stand-alone 5gFLEX operation (which includes for example, LTE CP, LTE L2, 5gFLEX PHY), the WTRU may be configured with components of the LTE control plane (for example, RRC connection, security, etc.) and with components of the LTE user plane (for example, EPS RABs, PDCP, RLC). The WTRU may also be configured with one or more 5G MAC instance(s) each with one or more 5gFLEX Uu(s). Triggers for initial access may be similar to the ones of a stand-alone 5gFLEX system or be a variation a stand-alone 5gFLEX system.

For stand-alone 5gFLEX operation, the WTRU may be configured with a 5G control plane and a 5G user plane. 5gFLEX Uu operation may be addressed in this case.

The methods and processes described herein may be performed on any of the devices described herein. In particular, the methods for initial access using system signatures or signature sequences may be performed on a WTRU, base station, AP, eNB, 5gNB, any other device described herein, or any other device that is capable of operating in a wireless communications system.

A system and method for providing access to a wireless communication system, such as a 5gFLEX system, is described herein. The system and method may include receiving by a communications device a system signature or signature sequence, determining, via the received system signature or signature sequence, one or more parameters associated with the wireless communication system, and accessing the wireless communication system using the communications device based on the one or more parameters. The embodiments described herein may be described using various wireless technologies including the 5G air interface, 5gFLEX. However, such descriptions are for exemplary purposes and do not limit the applicability of the embodiments described herein to other wireless technologies and/or to wireless technology using different principles.

The embodiments described herein may be used in support of the use cases enabled by the 5G air interface including but not limited to IBB, ICC, V2X, and mMTC. Support for ultra-low transmission latency (LLC) may include air interface latency as low as 1 ms RTT, which may support TTIs between 100 us and 250 us. Support for ultra-low access latency (for example, time from initial system access until the completion of the transmission of the first user plane data unit) may also be supported. At least ICC and V2X require end-to-end (e2e) latency of less than 10 ms.

Support for ultra-reliable transmission (URC) may include transmission reliability that is higher than legacy LTE systems. The transmission reliability target for URC is 99.999% transmission success and service availability. Mobility for speed in the range of 0-500 km/h may also be supported. At least IC and V2X require Packet Loss Ratio of less than 10e-6.

MTC operation (including narrowband operation) may also be supported. The air interface may efficiently support narrowband operation (for example, using less than 200 KHz), extended battery life (for example, up to 15 years of autonomy), and minimal communication overhead for small and infrequent data transmissions (for example, low data rate in the range of 1-100 kbps with access latency of seconds to hours).

OFDM is used as the basic signal format for data transmissions in LTE and IEEE 802.11. OFDM efficiently divides the spectrum into multiple parallel orthogonal subbands. Each subcarrier is shaped using a rectangular window in the time domain leading to sinc-shaped subcarriers in the frequency domain. OFDMA uses frequency synchronization and tight management of uplink timing alignment within the duration of the cyclic prefix to maintain orthogonality between signals and to minimize intercarrier interference. Such tight synchronization may also not be well-suited in a system where a WTRU is connected to multiple access points simultaneously. Additional power reduction is also typically applied to uplink transmissions to be compliant with spectral emission requirements to adjacent bands, in particular in the presence of aggregation of fragmented spectrum for the WTRU's transmissions.

Some of the shortcomings of conventional OFDM (CP-OFDM) may be addressed by more stringent RF requirements for implementations, especially when operating using a large amount of contiguous spectrum not requiring aggregation. A CP-based OFDM transmission scheme may also lead to a downlink physical layer for 5G that is similar to that of legacy system with, for example, modifications to pilot signal density and location.

Therefore, the 5gFLEX design may focus on other waveform candidates although conventional OFDM remains a candidate for 5G systems at least for the downlink transmission scheme. Flexible radio access for 5G may build upon technologies such as OFDMA and legacy LTE systems.

The 5gFLEX downlink transmission scheme may be based on a multicarrier (MC) waveform characterized by high spectral containment (i.e. lower side lobes and lower OOB emissions). Multicarrier modulation waveforms divide the channel into subchannels and modulate data symbols on subcarriers in these subchannels. MC waveform candidates for 5G include but are not limited to OFDM-OQAM and UFMC (UF-OFDM).

With OFDM-OQAM, a filter is applied in the time domain per subcarrier to the OFDM signal to reduce OOB. OFDM-OQAM causes very low interference to adjacent bands, does not need large guard bands, and does not require a cyclic prefix. OFDM-OQAM may be the most popular FBMC technique. However, it is sensitive to multipath effects and to high delay spread in terms of orthogonality thereby complicating equalization and channel estimation.

With UFMC (UF-OFDM), a filter is also applied in the time domain to the OFDM signal to reduce OOB. However, filtering is applied per subband to use spectrum fragments thereby reducing complexity and making UF-OFDM more practical to implement. However, if there are unused spectrum fragments in the band, OOB emissions in these fragments may remain as high as for conventional OFDM. In other words, UF-OFDM may improve over OFDM at the edges of the filtered spectrum and not in the spectral hole.

The waveforms described herein are used for exemplary purposes. Accordingly, the embodiments described herein are not limited to the above waveforms and may be applicable to other waveforms.

These waveforms may enable multiplexing signals with non-orthogonal characteristics (such as different subcarrier spacing) in frequency and the co-existence of asynchronous signals without requiring complex interference cancellation receivers and may facilitate the aggregation of fragmented pieces of spectrum in the baseband processing as a lower cost alternative to its implementation as part of the RF processing.

Co-existence of different waveforms within the same band may be used, for example, to support mMTC narrowband operation using SCMA. Another example is supporting within the same band a combination of different waveforms, such as for example, CP-OFDM, OFDM-OQAM and UF-OFDM for all aspects and for both downlink and uplink transmissions. Such co-existence may include transmissions using different types of waveforms between different WTRUs or transmissions from the same WTRU, which may be either simultaneously with some overlap or consecutive in the time domain.

Further co-existence aspects may include support for hybrid types of waveforms, including but not limited to the following: waveforms and/or transmissions that support at least one of a possibly varying CP duration (for example, from one transmission to another), a combination of a CP and a low power tail (for example, a zero tail), a form of hybrid guard interval using a low power CP and an adaptive low power tail, and the like. Such waveforms may support dynamic variation and/or control of further aspects such as how to apply filtering (for example, whether filtering is applied at the edge of the spectrum used for reception of any transmission(s) for a given carrier frequency, at the edge of a spectrum used for reception of a transmission associated with a specific spectrum operation mode (SOM), per subband, or per group thereof).

The uplink transmission scheme may use the same or a different waveform as used for downlink transmissions.

Multiplexing of transmissions to and from different WTRUs in the same cell may be based on FDMA and TDMA.

The 5gFLEX radio access design may be characterized by a very high degree of spectrum flexibility that may enable deployment in different frequency bands with different characteristics. These characteristics may include different duplex arrangements, and different and/or variable sizes of the available spectrum including contiguous and non-contiguous spectrum allocations in the same or different bands. The 5gFLEX radio access design may support variable timing aspects including support for multiple TTI lengths and support for asynchronous transmissions.

Both TDD and FDD duplexing schemes may be supported in the embodiments described herein. For FDD operation, supplemental downlink operation is supported using spectrum aggregation. FDD operation supports both full-duplex FDD and half-duplex FDD operation. For TDD operation, the DL/UL allocation is dynamic; i.e. the DL/UL allocation may not be based on a fixed DL/UL frame configuration. Rather, the length of a DL or a UL transmission interval is set per transmission opportunity.

The 5G air interface design may enable different transmission bandwidths on both the uplink and the downlink ranging from anything between a nominal system bandwidth up to a maximum value corresponding to the system bandwidth.

Figure 2:
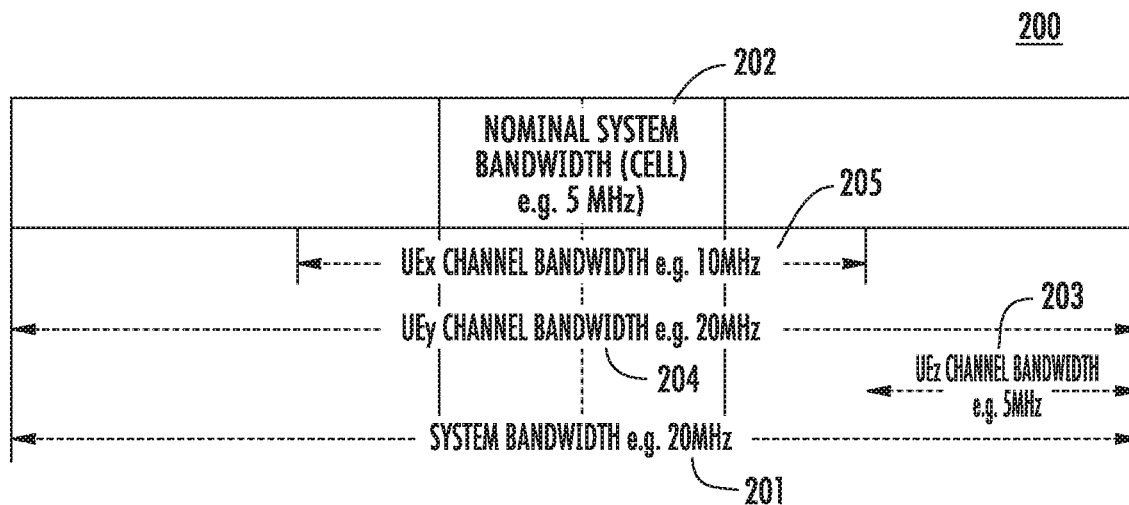
FIG. 2 is a diagram that provides an example of some of the system transmission bandwidths supported by a 5gFLEX system.

FIG. 2 is a diagram that provides an example of some of the system transmission bandwidths 200 supported by a 5gFLEX system that supports methods for initial access using system signatures or signature sequences in accordance with any of the embodiments described herein. For single carrier operation, supported system bandwidths may include at least 5, 10, 20, 40 and 80 MHz. In some embodiments, supported system bandwidths may include any bandwidth in a given range (for example, from a few MHz up to 160 MHz). Nominal bandwidths may have one or more fixed possible values. Narrowband transmissions of up to 200 KHz may be supported within the operating bandwidth for MTC devices. It is noted that system bandwidth 201, as used herein, may refer to the largest portion of spectrum that may be managed by the network for a given carrier. For such a carrier, the portion of spectrum that a WTRU minimally supports for cell acquisition, measurements, and initial access to the network may be referred to herein as the nominal system bandwidth 202.

A WTRU may be configured with channel bandwidths 203, 204, and/or 205 that are within the range of the entire system bandwidth. The configured channel bandwidths 203, 204, and 205 of a WTRU may or may not include the nominal system bandwidth 202 part of the system bandwidth 201. Bandwidth flexibility may be achieved by the 5G air interface of FIG. 2 because all applicable sets of RF requirements for a given maximum operating bandwidth in a band may be met without the introduction of additional allowed channel bandwidths for that operating bandwidth due to the efficient support of baseband filtering of the frequency domain waveform. Methods to configure, reconfigure and/or dynamically change the configured channel bandwidths 203, 204, and 205 of a WTRU for single carrier operation may be supported by the 5G air interface of FIG. 2 as well as methods to allocate spectrum for narrowband transmissions within the nominal system bandwidth 202, system bandwidth 201, or configured channel bandwidths 203, 204, and 205.

The physical layer of a 5G air interface may also be band-agnostic and may support operation in licensed bands below 5 GHz as well as operation in the unlicensed bands in the range 5-6 GHz. For operation in the unlicensed bands, LBT Cat 4 based channel access framework similar to LTE LAA may be supported. Methods to scale and manage (e.g., scheduling, addressing of resources, broadcasted signals, measurements) cell-specific and/or WTRU-specific channel bandwidths for arbitrary spectrum block sizes may also be supported.

Downlink control channels and signals may support FDM operation. A WTRU may acquire a downlink carrier by receiving transmissions using only the nominal part of the system bandwidth; i.e. the WTRU may not initially be required to receive transmissions covering the entire bandwidth that is being managed by the network for the concerned carrier.

Downlink data channels may be allocated over a bandwidth that may or may not correspond to the nominal system bandwidth, without restrictions other than being within the WTRU's configured channel bandwidth. For example, the network may operate a carrier with a 12 MHz system bandwidth using a 5 MHz nominal bandwidth allowing devices supporting at most 5 MHz maximum RF bandwidth to acquire and access the system while possibly allocating +10 to −10 MHz of the carrier frequency to other WTRU's supporting up to 20 MHz worth of channel bandwidth.

Figure 3:
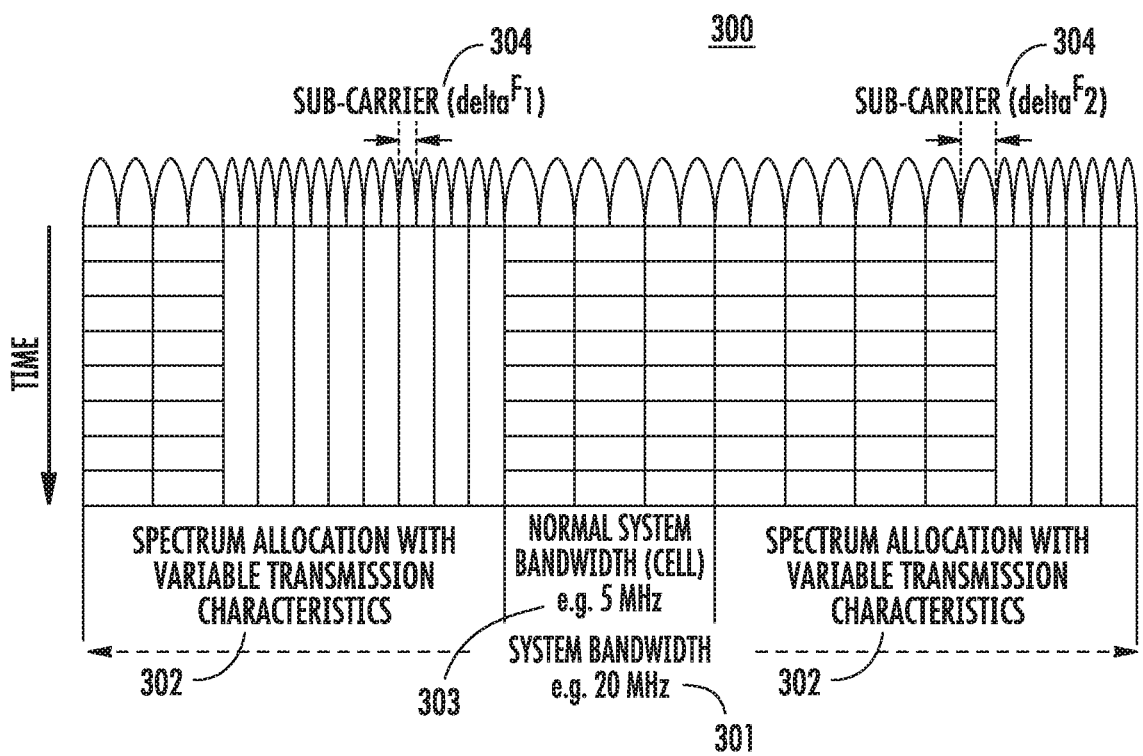
FIG. 3 is a diagram of an example flexible spectrum allocation supported by a 5gFLEX system.

FIG. 3 is a diagram of an example flexible spectrum allocation 300 supported by a 5gFLEX system that supports methods for initial access using system signatures or signature sequences in accordance with any of the embodiments described herein. The system bandwidth 301 may support spectrum allocation with variable transmission characteristics 302 and the nominal system bandwidth 303. In the example of FIG. 3, the different subcarriers 304 may be at least conceptually assigned to different modes of operation (e.g., SOM). Different SOM may be used to fulfill different requirements for different transmissions. A SOM may include a subcarrier spacing, a TTI length, and/or one or more reliability aspects (e.g., hybrid automatic repeat request (HARQ) processing aspects) and possibly also a secondary control channel. SOM may refer to a specific waveform or to a processing aspect (e.g., support for coexistence of different waveforms in the same carrier using FDM and/or TDM, or support for coexistence of FDD operation in a TDD band in a TDM manner or otherwise).

A WTRU may be configured to perform transmissions according to one or more SOMs. For example, a SOM may correspond to transmissions that use at least one of the following: a specific TTI duration, a specific initial power level, a specific HARQ processing type, a specific upper bound for successful HARQ reception/transmission, a specific transmission mode, a specific physical channel (uplink or downlink), a specific waveform type, or a transmission according to a specific RAT (for example, legacy LTE or according to a 5G transmission method). A SOM may also correspond to a QoS level and/or a related aspect, for example, maximum/target latency, maximum/target BLER, or another QoS level or related aspect. A SOM may further correspond to a spectrum area and/or to a specific control channel or aspect thereof (including search space, DCI type, etc.). For example, a WTRU may be configured with a SOM for each of a URC type of service, a LLC type of service, and a MBB type of service. A WTRU may have a configuration for a SOM for system access and also for transmission/reception of L3 control signaling (for example, RRC signaling) in a portion of a spectrum associated with the system such as in nominal system bandwidth 303.

Spectrum aggregation may be supported for single carrier operation, whereby the WTRU supports transmission and reception of multiple transport blocks (TBs) over contiguous or non-contiguous sets of physical resource blocks (PRBs) within the same operating band. A single TB may also be mapped to separate sets of PRBs.

Simultaneous transmissions may be associated with different SOM requirements. Multicarrier operation may also be supported using contiguous or non-contiguous spectrum blocks within the same operating band, or across two or more operating bands. Aggregation of spectrum blocks using different modes (for example, FDD and TDD) and using different channel access methods (for example, licensed and unlicensed band operation below 6 GHz) may also be supported. The multicarrier aggregation of a WTRU may be configured, reconfigured, or dynamically changed.

Downlink and uplink transmissions may be organized into radio frames characterized by a number of fixed aspects (for example, location of downlink control information (DCI)) and a number of varying aspects (for example, transmission timing and supported types of transmissions).

A basic time interval (BTI) is expressed in terms of an integer number of one or more symbol(s), where symbol duration may be a function of the subcarrier spacing applicable to the time-frequency resource. For FDD, subcarrier spacing may thus differ between the uplink carrier frequency $f_{UL}$ and the downlink carrier frequency $f_{DL}$ for a given frame.

A transmission time interval (TTI) may be the minimum time supported by the system between consecutive transmissions where each would be associated with different TBs for the downlink ($TTI_{DL}$), for the uplink (UL TRx) excluding any preamble (if applicable) but including any control information (for example, downlink control information (DCI) or uplink control information (UCI)). A TTI may be expressed in terms of integer number of one of more BTI(s). A BTI may be specific and/or associated with a given SOM.

Supported frame durations may include but are not limited to 100 us, 125 us (⅛ ms), 142.85 us (¼ ms is 2 nCP LTE OFDM symbols), and 1 ms to enable alignment with the legacy LTE timing structure.

Figure 4:
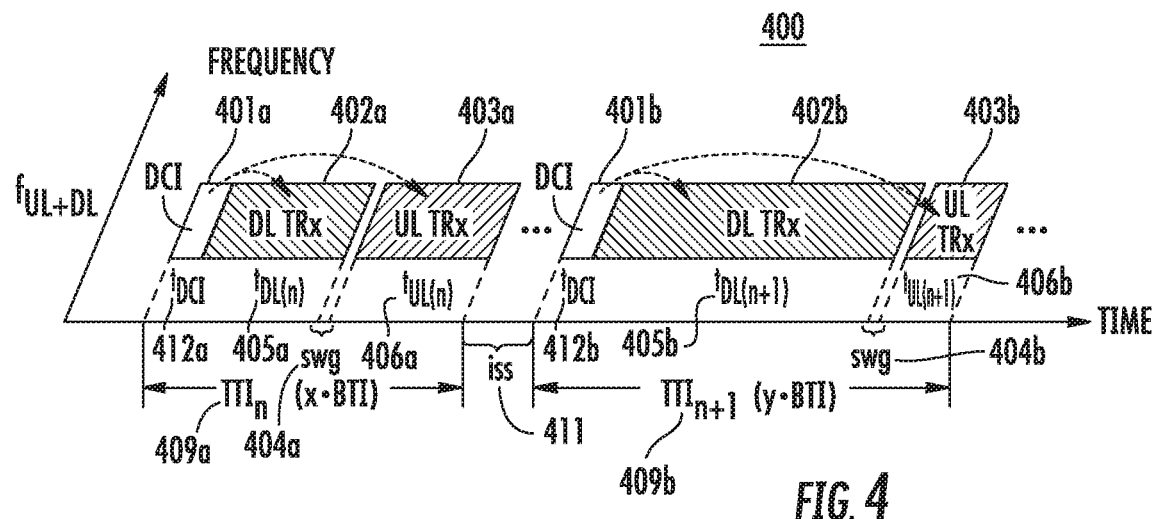
FIG. 4 is a diagram of an example flexible frame structure for TDD that may be used in a wireless communications system such as a 5gFLEX system.

FIG. 4 is a diagram of an example flexible frame structure 400 for TDD that may be used in a wireless communications system such as a 5gFLEX system supporting initial access using system signatures or signature sequences in accordance with one embodiment, which may be used in combination with any of the embodiments described herein. As shown in the example of FIG. 4, the start of each frame may be indicated by a downlink control information (DCI) 401a and 401b of a fixed time duration $t_{dci}$ 412a and 412b preceding any DL transmission portion of each frame (DL TRx) 402a and 402b for the concerned carrier frequency, $f_{UL+DL}$. The duration of the DL transmission portions 402a and 402b may be based on an integer number of transmit blocks (TBs).

In the example of FIG. 4, the DCI 401a may indicate at least duration $t_{DL(n)}$ 405a for the DL TRx portion 402a for frame n, and DCI 401b may indicate at least duration $t_{DL(n+1)}$ 405b for the DL TRx portion 402b for frame n+1, in addition to any downlink assignment(s) and/or any uplink grant(s) indicated by the DCIs 401a and 401b.

The frame may also include an UL transmission portion of the frame (UL TRx) 403a and 403b. The duration of the UL transmission portions 403a and 403b may be based on an integer number of transmit blocks (TBs). In the example of FIG. 4, the DCI 401a may indicate at least duration $t_{UL(n)}$ 406a for the UL TRx portion 403a for frame n, and DCI 401b may indicate at least duration $t_{UL(n+1)}$ 406b for the UL TRx portion 403b for frame n+1. If the uplink portion of the frame is present as shown in the example of FIG. 4, a switching gap (SWG) 404a and 404b may precede the uplink portion of each frame.

The WTRU may then derive the resulting TTI duration for each frame based on the DCIs 401a and 401b. As shown in the example of FIG. 4, the variable duration of each frame may be expressed in terms of a TTI duration expressed in terms of an integer number of BTIs. In the example of FIG. 4, the duration of frame n is expressed in terms of a $TTI_n$ expressed as x*BTI 409a, and the duration of frame n+1 is expressed in terms of a $TTI_{n+1}$ expressed as y*BTI 409b. The example of FIG. 4 also shows the inter-subframe spacing (ISS) 411.

For TDD, 5gFLEX may support device-to-device (D2D)/vehicle-to-everything (V2X)/Sidelink operation in the frame structure 400 by including respective downlink control and forward direction transmissions in the DCI and DL TRx portion (if a semi-static allocation of the respective resources is used). Alternatively, D2D/V2X/Sidelink operation may be supported in the frame structure 400 by including respective downlink control and forward direction transmissions in the DL TRx portion (for dynamic allocation) and by including the respective reverse direction transmission in the UL TRx portion of the frame structure 400.

Figure 5:
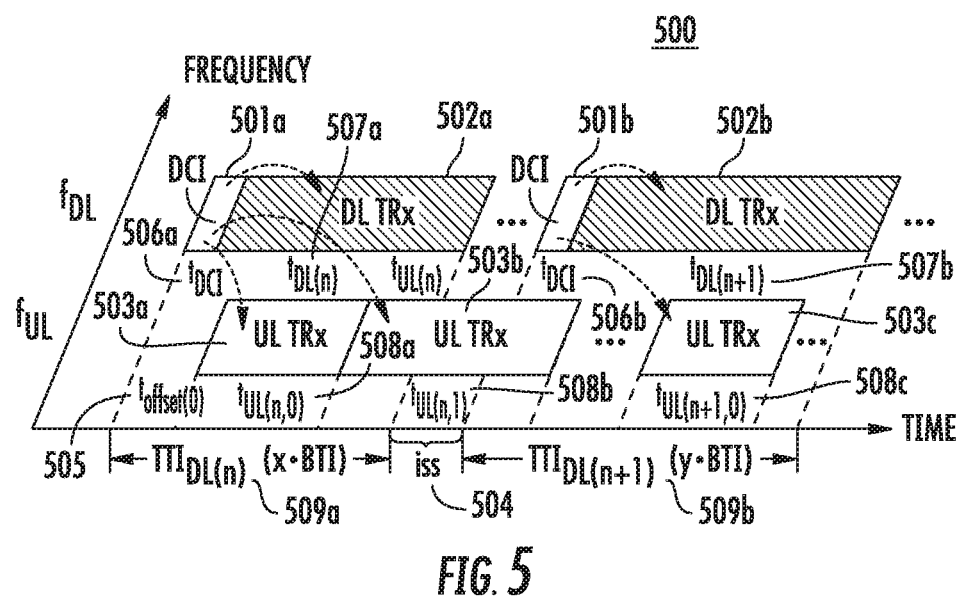
FIG. 5 is a diagram of an example frame structure for FDD that may be used in a wireless communications system such as a 5gFLEX system.

FIG. 5 is a diagram of an example frame structure 500 for FDD that may be used in a wireless communications system such as a 5gFLEX system supporting initial access using system signatures or signature sequences in accordance with another embodiment, which may be used in combination with any of the embodiments described herein. The frame structure 500 may include a downlink reference TTI and one or more TTI(s) for the uplink. As shown in the example of FIG. 5, the start of the frame may be indicated by a DCI 501a and 501b of a fixed time duration $t_{dci}$ 506a and 506b preceding any downlink data transmission portion (DL TRx) 502a and 502b for the concerned carrier frequency $f_{DL}$. The duration of the DL transmission portions 502a and 502b may be based on an integer number of transmit blocks (TBs).

In the example of FIG. 5, the DCI 501a may indicate the duration $t_{DL(n)}$ 507a for the DL TRx portion 502a for frame n, and DCI 501b may indicate the duration for $t_{DL(n+1)}$ 507b for the DL TRx portion 502b for frame n+1. As shown in the example of FIG. 5, the variable duration of each frame may be expressed in terms of the downlink reference TTI durations expressed in terms of an integer number of BTIs. In the example of FIG. 5, the duration of frame n is expressed in terms of a $TTI_{DL(n)}$ expressed as x*BTI 509a, and the duration of frame n+1 is expressed in terms of a $TTI_{DL(n+1)}$ expressed as y*BTI 509b.

The DCI(s) may indicate an offset ($t_{offset}$) 505 and the TTI duration for any applicable uplink transmission(s) that contains a transport block. Separate DCIs may also be used for the downlink and uplink directions. In the example, of FIG. 5, the frame may include an uplink transmission portion (UL TRx) 503a, 503b, and 503c for the concerned carrier frequency $f_{UL}$. The duration of the UL transmission portions 503a, 503b, and 503c may be based on an integer number of transmit blocks (TBs). The start of an uplink TTI may be derived using the offset ($t_{offset}$) 505 applied from the start of the downlink reference frame that overlaps with the start of the uplink frame. The $t_{offset}$ 505 may include a timing advance, for example, in cases where UL synchronization is applicable. In the example of FIG. 5, DCI 501a may indicate at least duration $t_{UL(n,0)}$ 508a and $t_{UL(n,1)}$ 508b for the UL TRx portions 503a and 503b for frame n. DCI 501b may indicate at least duration $t_{UL(n+1,0)}$ 508c for the UL TRx portion 503c for frame n+1. The example of FIG. 5 also shows the ISS 504.

For FDD, 5gFLEX may support D2D/V2x/Sidelink operation in the UL TRx portion of the frame structure 500 by including respective downlink control, forward direction, and reverse direction transmissions in the UL TRx portion (dynamic allocation of the respective resources may be used).

A scheduling function may be supported in the medium access control (MAC) layer. Scheduling modes including but not limited to the following may be used: (1) network-based scheduling for tight scheduling in terms of resources, timing, and transmission parameters of downlink transmissions and/or uplink transmissions; and (2) WTRU-based scheduling for more flexibility in terms of timing and transmission parameters. For these modes, scheduling information may be valid for a single or for multiple TTIs.

Network-based scheduling enables the network to tightly manage the available radio resources assigned to different WTRUs such as to optimize the sharing of such resources. Dynamic scheduling is supported in this mode.

WTRU-based scheduling enables the WTRU to opportunistically access uplink resources with minimal latency on an as-needed basis within a set of shared or dedicated uplink resources assigned (dynamically or not) by the network. Both synchronized and unsynchronized opportunistic transmissions are supported. Both contention-based transmissions and contention-free transmissions are supported. Support for opportunistic transmissions (scheduled or unscheduled) may meet the ultra-low latency requirements for 5G and the power saving requirement of the mMTC use case.

5gFLEX may support an association between data available for transmission and available resources for uplink transmissions. Multiplexing of data with different QoS requirements within the same TB may be supported as long as such multiplexing neither introduces negative impact to the service with the most stringent QoS requirement nor introduces unnecessary waste of system resources.

A transmission may be encoded using a number of different encoding methods, which may have different characteristics. For example, an encoding method may generate a sequence of information units. Each information unit, or block, may be self-contained. For example, an error in the transmission of a first block may not impair the ability of the receiver to successfully decode a second block, and in particular if the second block is error-free and/or if sufficient redundancy may be found in the second block or in a different block for which at least a portion was successfully decoded. Examples of encoding methods also include raptor/fountain codes whereby a transmission may consist of a sequence of N raptor codes. One or more such codes may be mapped to one or more transmission "symbols" in time. A "symbol" may thus correspond to one or more sets of information bits, for example, one or more octets. Such encoding may be used to add forward error correction (FEC) to a transmission whereby the transmission may use N+1 or N+2 raptor codes (or symbols, assuming a one raptor code symbol relationship) so that the transmission may be more resilient to the loss of one "symbol," for example, due to interference or puncturing by another transmission overlapping in time.

Logical Transport Connectivity may be different than the logical channel (LCH) used for legacy LTE. An LCH may represent a logical association between data packets and/or PDUs. Such an association may be based on such data units being associated with the same bearer (similar to legacy) and/or being associated with the same SOM and/or slice. For example, the association may be characterized by at least one of a chaining of processing functions, an applicable physical data (and/or control) channel (or instance thereof), an instantiation of a protocol stack including a specific portion being centralized (for example, PDCP only or anything except RF), and/or another portion closer to the edge (for example, MAC/PHY in the TRP or RF only) that may be separated by a fronthauling interface. Different access procedures may be triggered as a function of the type of LCH for which data is available when the trigger is based on data arrival.

Logical Channels Grouping (LCG) may be different than the LCH grouping or characterization used for legacy LTE. An LCG may consist of a group of LCH using one or more criteria. The criteria may be that the one or more LCH may have a similar priority level applicable to all LCHs of the LCG (similar to legacy). The criteria may also be that the one or more LCH may be associated with the same SOM or type thereof or the same slice or type thereof. This association may characterized by at least one of a chaining of processing functions, an applicable physical data (and/or control) channel (or instance thereof), an instantiation of a protocol stack including a specific portion being centralized (for example, PDCP only, or anything except RF) and/or another portion closer to the edge (for example, MAC/PHY in the TRP or RF only) that may be separated by a fronthauling interface.

A RAN slice may include the RAN functions, transport network functions, and resources (for example, radio resources and backhaul/fronthaul resources along with core network functions/resources required to provide end-to-end services to the user). The terms RAN slice or slice may be used interchangeably herein. The transport or core network functions may be virtualized on a general purpose processor, run as network functions on specialized hardware, or split between specialized hardware and general purpose hardware. A PLMN may comprise one or more slices, wherein each slice is equivalent to a single, common, or general purpose network of an operator. Each slice may include one or more SOMs optimized to support various services that the slice offers. For example, WTRUs served within a slice may have one or more of the following aspects in common: services and/or QoE requirements (e.g., ULLRC, eMBB, MMTC), WTRU categories (for example, CAT 0 to M and beyond, and additional categories may be defined for >6 GHz to differentiate beamforming capability), coverage requirements (for example, normal coverage, enhanced coverage), PLMN/operators, support of a specific Uu interface (for example, LTE, LTE-Evo, 5G below 6 GHz, 5G above 6 GHz, Unlicensed), and served by same core network slice.

A Transport Channel (TrCH) as referred to herein may include a specific set of processing steps and/or a specific set of functions applied to the data that may affect one or more transmission characteristics over the radio interface. Legacy LTE defines multiple types of TrCHs, including, for example, the Broadcast Channel (BCH), the Paging Channel (PCH), the Downlink Shared Channel (DL-SCH), the Multicast Channel (MCH), the Uplink Shared Channel (UL-SCH), and the Random Access Channel (that typically does not carry any user plane data). The main transport channels for carrying user plane data are the DL-SCH and the UL-SCH, for the downlink and for the uplink, respectively.

For 5G systems, the augmented set of requirements supported by the air interface may lead to the support of multiple transport channels, such as for user and/or control plane data and for a single WTRU. Accordingly, the term TrCH as used herein may have a broader meaning than when the term is used in reference to LTE systems. For example, a transport channel for URLLC such as the URLLCH, a transport channel for mobile broadband (MBBCH), and/or a transport channel for machine type communications (MTCCH) may be defined for downlink transmission (for example, DL-URLLCH, DL-MBBCH and DL-MTCCH) and for uplink transmissions (for example, UL-URLLCH, UL-MBBCH and UL-MTCCH). A type of TrCH may correspond to a type of physical data channel, may be associated with a SOM, may be associated with a physical control channel, and/or with a specific set of DCIs. Different access and procedures may be triggered as a function of the type of TrCH LCH required by the network/WTRU or for the type of associated priority/QoS level and/or SOM.

Figure 6:
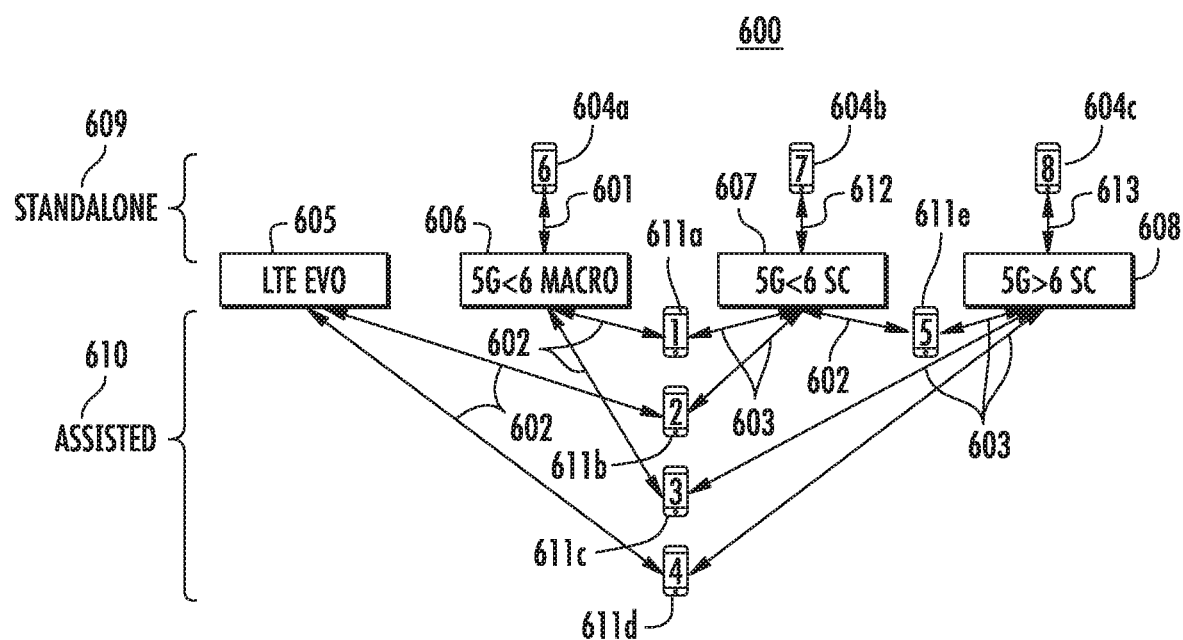
FIG. 6 is a diagram of the example assistance modes available.

FIG. 6 is a diagram of the example assistance modes 600 available, which may be used in combination with any of the embodiments described herein. WTRUs may be connected to TRPs either in standalone mode 609 or assisted mode 610. For example, WTRUs 604a, 604b, and 604c are connected in standalone mode 609, while WTRUs 611a, 611b, 611c, and 611d are connected in assisted mode 610. The group of cells that require assistance may be called the assisted layer 603 and the group of cells that provides the assistance may be called the assistance layer 602.

In the example of FIG. 6, the following assistance modes are shown:

WTRU 611a connected to 5Gflex small cell in sub-6 GHz band 607 assisted by 5Gflex macro cell in sub-6 GHz band 606;

WTRU 611b connected to 5Gflex small cell in sub-6 GHz band 607 assisted by LTE-Evo macro cell 605;

WTRU 611c connected to 5Gflex small cell in above-6 GHz band 608 assisted by 5Gflex macro cell in sub-6 GHz band 606;

WTRU 611d connected to 5Gflex small cell in above-6 GHz band 608 assisted by LTE-Evo macro cell 605;

WTRU 611e connected to 5Gflex small cell in below-6 GHz band 607 assisted by 5Gflex small cell in above-6 GHz band 608;

In the example of FIG. 6, the following standalone modes are shown:

WTRU 604b connected 612 to 5Gflex small cell in below-6 GHz band 607 in standalone mode;

WTRU 604a connected 601 to 5Gflex macro cell in sub-6 GHz band 606 in standalone mode; and WTRU 604c connected 613 to 5Gflex small cell in above-6 GHz 608 band in standalone mode.

Figure 7:
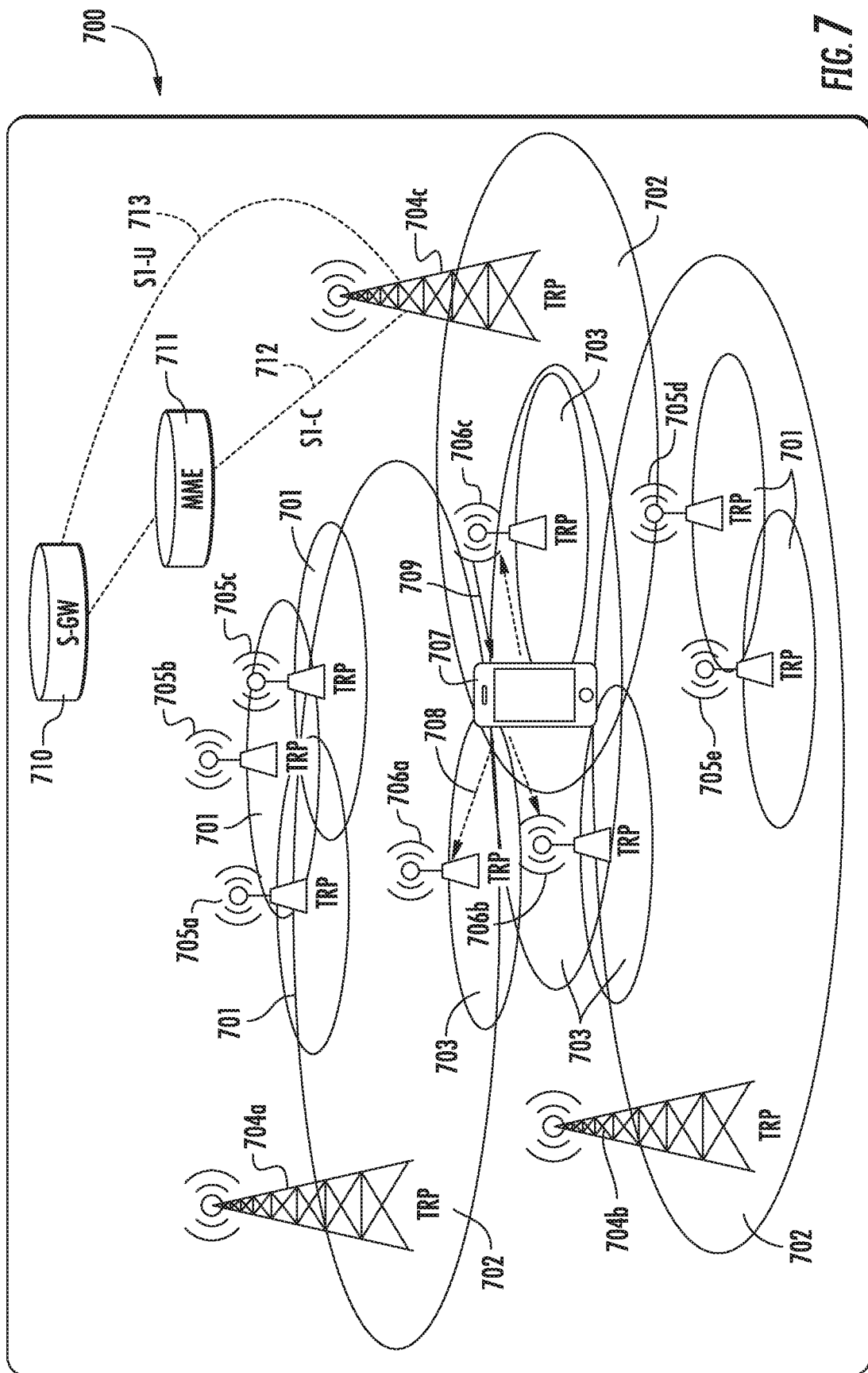
FIG. 7 is a diagram of an example system for initial access using system signatures or signature sequences.

FIG. 7 is a diagram of an example system 700 for initial access using system signatures or signature sequences, which may be used in combination with any of the embodiments described herein. A network may support different numerologies, each associated with a specific access method tailored for a specific type of service/use case. Referring to FIG. 7, WTRU 707 may include the elements of example WTRUs 102 of FIG. 1A, FIG. 1B, and FIG. 1C. WTRU 707 may be configured to receive and/or detect one or more system signatures or system signature sequences.

A system signature may include or comprise a signal structure using a sequence. The terms system signature, system signature sequence, signature sequence, and signature may be used interchangeably herein. These system signatures may be similar to a synchronization signal, such as LTE PSS or SSS. A system signature as used herein may be any type of signal received or transmitted by a WTRU, TRP, any other device described herein, or any other device capable of operating in a wireless communications system, and a system signature may be used in any of the embodiments described herein.

In the example of FIG. 7, each TRP of a plurality of TRPs each transmit a system signature. TRPs 705a, 705b, 705c, 705d, and 705e transmit system signature A 701, which may, for example, be associated with Numerology A and mMTC services. TRPs 704a, 704b, and 704c transmit system signature B 702, which may, for example, be associated with Numerology B and Default Access and eMBB services. TRPs 706a, 706b, and 706c transmit system signature C 703, which may, for example, be associated with Numerology C and URLLC services. TRPs, such as TRP 704c in the example of FIG. 7, may be connected to MME 711 via S1-C interface 712 and serving gateway (S-GW) 710 via S1-U interface 713.

A node, such as the TRPs and/or WTRU of FIG. 7, may transmit and/or receive one or more system signature on one or more frequency and time resources. System signatures may occupy the entire bandwidth of an operating channel or only a portion of the bandwidth. System signatures may be transmitted once within a period or multiple times per window. For example, a burst of a signal may be transmitted x times in a window and not transmitted until a next window occurs. The windows may or may not overlap. System signatures may occupy either a partial OFDM symbol (for example, transmitted in the guard period or cyclic prefix as a unique word) or occupy one or more OFDM symbols. Different types of physical signals may be used as system signatures including but not limited to the following: synchronization signals, cell or TRP specific reference signals (for example, CRS), reference signals that are common to a group of TRPs (TRPG), preambles, a unique word, a positioning reference signal, other reference signals, bits in a master information block (MIB), bits in a system information block (SIB), any other broadcast channel, or a low overhead physical channel that carries a low number of payload bits. Such a physical channel may be designed for additional robustness, for example, with an attached CRC.

System signatures may be specific to a particular node or TRP within a given area (for example, by uniquely identifying the node), or they may be common to a plurality of nodes or TRPs within an area. A WTRU may identify or distinguish the transmitting node uniquely from the system signature. A given system signature may be associated with more than one node, and a WTRU may use the received system signature to identify/characterize one or more parameters or operational aspects associated with a group of nodes. For example, a system signature may be characterized as follows:

A system signature may be TRP specific and may be used to identify and/or distinguish TRPs;

A system signature may be TRPG specific in which a same system signature for two or more TRPGs within a layer may identify common access parameters;

A system signature may be layer specific and may differentiate a macro layer from a small cell layer;

A system signature may be WTRU specific such as for use in D2D operation;

A system signature may be relay specific such as for use in relay operation;

A system signature may be SOM/slice specific. Each SOM/Slice may carry its own system signature. In one example, the system signature associated with the SOM/slice may be transmitted using the radio resources (time/frequency resources) and/or parameters (for example, numerology, TTI, CP etc.) specific to that SOM/slice.

Each system signature may be composed of different parts called sub-signatures. For example, one sub-signature may be antenna port specific, TRP specific, SOM specific, or specific to plurality of TRPs, etc. Alternatively or additionally, a WTRU may receive more than one distinct system signature from the transmitter (TRP or another WTRU).

Different types of system signatures may be identified and/or distinguished by the format of the signals used as signatures. For example, synchronization signals may be used as layer specific system signatures, whereas positioning reference signals may be used as TRP specific reference signals. Different types of system signatures may be defined and/or transmitted in order to support different WTRU capabilities. For example, WTRUs under normal coverage may receive the whole system signature, whereas WTRUs with enhanced coverage requirements and/or with limited RF bandwidth capability may receive a sub-signature of the whole signature and obtain partial information associated with the received sub-signature. Different sub-signatures of system signatures may be associated with a different periodicity or repetition factor.

Different sub-signatures and/or distinct system signatures may have a predefined linkage between them. The linkage may be defined in terms of one or more of the following: a timing relation (for example, symbols, subframes, etc.), a frequency relation (for example, subcarrier mapping, RB offset, etc.), a spatial relation (for example, mapped to different beams or different types of beams such as wide beams or narrow beams), aspects of the signal itself (for example, sequence number, orthogonal code, signal structure used, repetition number), and a different antenna port (for example, TRP specific system signatures from antenna port x and TRPG specific system signatures from antenna port y). A WTRU may determine one or more system parameters or a configuration using the linkage between system signatures and/or sub-signatures.

A WTRU may determine the placement of system signatures in the frame structure and/or resource grid (for example, in time and/or frequency resources) using a predefined configuration. Alternatively, the placement of a system signature within the frame structure and/or resource grid may be flexible to avoid interference and to enable forward compatibility. The WTRU may determine this flexible placement from a cell specific configuration or in relation to other signals/channels or provided by an assistance layer (for example, LTE layer) or using a blind detection within a time window. Detection of one signature may enable detection of other signatures associated with the same transmitting node (for example, TRP and/or WTRU).

Referring to FIG. 7, WTRU 707 may support multiple services such as mMTC, eMBB, and URLLC, access methods in support of the multiple services, and multi-connectivity. WTRU 707 may receive system signature A 701, system signature B 702, and system signature C 703 and then determine one or more parameters associated with a network based on each system signature. For example, WTRU 707 may derive an index from each system signature and may use it to retrieve associated parameters, which may for example be retrieved from an access table stored in the WTRU. For example, WTRU 707 may use the received power associated with the system signature for open-loop power control, which may be used for the purpose of setting the initial transmission power if WTRU 707 determines that it may access and/or transmit to the system using applicable resources of the system. In another example, WTRU 707 may use the timing of the received system signature or signature sequence for the purpose of setting the timing of a transmission such as a preamble on a PRACH resource if WTRU 707 determines that it may access and/or transmit to the system using applicable of the system.

WTRU 707 may be configured with a list of one or more entries, which may be referred to herein as an access table. The access table may be stored in the memory of WTRU 707 as described above, and the access table may be indexed whereby each entry is associated with a system signature and/or to a sequence thereof. The entries may be parameters for each system signature. Such entries may include but are not limited to an access method (for example, PRACH) numerology aspects (for example, TTI duration), and TRP/G-specific control channel information. Based on this index, an entry in the access table may be associated with a plurality of nodes or TRPs. The WTRU may receive the access table by means of a transmission as described above. This received transmission may use dedicated resources, which may for example be by RRC configuration and/or by means of a transmission using broadcasted resources. When using broadcasted resources, the periodicity of the transmission of an access table may be relatively long (for example, up to 10240 ms), and it may be longer than the periodicity of the transmission of a signature (for example, in the range of 100 ms). An access table as referred to herein may comprise any type of system information received by WTRU 707 for any of the purposes described herein.

The access table may provide initial access parameters for one or more areas. Each entry in the access table may provide one or more parameters necessary for performing an initial access procedure with the system. These parameters may include at least one set of one or more random access parameters, which may include but are not limited to applicable physical layer resources in time and/or frequency (for example, PRACH resources), an initial power level, and physical layer resources for reception of a response. These parameters may further include access restrictions, which may include but are not limited to Public Land Mobile Network (PLMN) identity and/or CSG information. These parameters may further include routing-related information such as the applicable routing area(s).

WTRU 707 may have data available for transmission associated with a specific service, determine by measurements the detected system signatures, determine the access configuration applicable to the service, and perform a corresponding access procedure using system information associated with the determined access table entry. WTRU 707 may then receive at least one random access response (RAR) such as RAR 708 or 709 and establish a Uu connection with the system.

Figure 8:
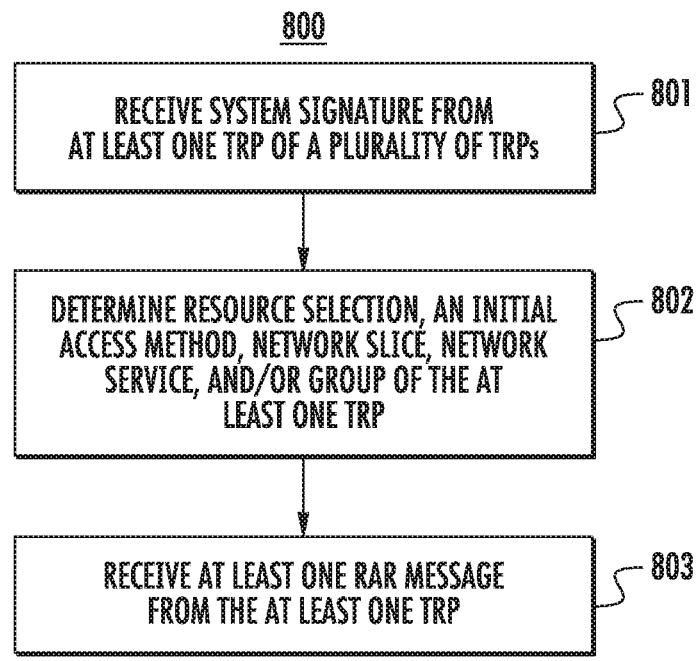
FIG. 8 is a flow diagram of an example process for initial access using system signatures or signature sequences.

FIG. 8 is a flow diagram of an example process for initial access using system signatures or signature sequences 800 that may be performed in the example system 700 described above and used in combination with any of the embodiments described herein. While each step of the process 800 in FIG. 8 is shown and described separately, multiple steps may be executed in a different order than what is shown, in parallel with each other, or concurrently with each other. The process of FIG. 8 is performed by a WTRU for exemplary purposes, but it may also be performed by any node operating in a wireless communications system such as a TRP, eNB, 5gNB, AP, or base station. In the example of FIG. 8, a WTRU, via the transceiver or receiver of the WTRU as described above, may receive a system signature 801 from at least one TRP of a plurality of TRPs. The system signature may be associated with any of the parameters and characteristics described above. For example, the received system signature may be associated with a numerology, a network slice, a discontinuous transmission (DTX) state, a control channel characteristic, or a network service.

The WTRU may then determine, with use of a stored access table, a resource selection, an initial access method of a plurality of access methods that are specific to the numerology associated with the system signature, a network slice, a network service, and/or a group of the at least one TRP 802. During this step, the WTRU may measure, read, and/or decode the received system signature and perform one or more actions related to a specific aspect of the system signatures. The relation between different sub-signatures, different distinct system signatures, and/or types of signatures sequences may convey one or more aspects of the system configuration. The relation may be in the time domain (for example, symbols or an offset) and/or frequency domain (for example, subcarriers or resource blocks (RBs)). The relation may also include properties of the system signature (for example, type, sequence number, or the root sequence). Referring to FIG. 8, the WTRU may then receive at least one RAR message from the at least one TRP 803.

During the procedure described in FIG. 8, the WTRU may determine system operation/configurations from the received system signatures including but not limited to the following:

The WTRU may determine a logical area with one or more common aspects/properties. The WTRU may assume that a group of TRPs with the same system signature uses a common system configuration (for example, initial access parameters). The group of TRPs may belong to the same signature area or common SIB area within which the WTRU may not reacquire the system information upon TRP change. In some embodiments, the WTRU may see the group of TRPs as a single TRP or a logical cell. The WTRU may assume that the group of TRPs with the same system signature is associated with the same central unit. The WTRU may for example perform layer2 re-establishment within the TRPs associated with the same central unit instead of layer3 re-establishment.

The WTRU may determine a pointer to an entry in a global system information table. The WTRU may apply the system information (for example, initial access parameters including a PRACH configuration, etc.) in the access table associated with or indexed by that system signature or parts of the system signature. Also, when the WTRU no longer receives a system signature or parts of a system signature, the WTRU may cease to use the current system information associated with that system signature or parts of the system signature.

The WTRU may determine a mapping to a pre-defined broadcast RNTI. The WTRU may start to monitor control channels for a pre-defined broadcast RNTI associated with that system signature. The broadcast RNTI may then be used to schedule system information and/or an access table associated with that system signature.

The WTRU may determine support of a service (for example, eMBB, MMTC, ULLRC) or parts of a system signature or a group of reserved system signature sequences that may indicate support of specific service. For example, system signature 1 may indicate support of eMBB, signature 2 may indicate support of MMTC, and signature 3 may indicate support for ULLRC. Alternatively, a relation between system signatures or parts of system signatures may convey the same information.

The WTRU may determine support of a SOM by using a system signature that may be associated with a plurality of SOMs. The mapping between a SOM and a system signature may be pre-defined or indicated as a part of the access table information. The WTRU may determine the presence of one or more SOMs within the frame structure based on the presence of one or more system signatures associated with those SOMs.

The WTRU may determine the DTX state of the network. Each TRP in the network may be in one of the various DTX states or visibility levels. For example, completely OFF, transmitting only system signatures, CRS is OFF, CRS is ON, periodic transmission of access tables, on-demand transmission of access tables, transmitting access tables for high priority services (for example, emergency calls), etc. The WTRU may determine the DTX state of the TRP from the system signatures transmitted by the TRP. One or more system signatures may not directly provide system information, and rather they may point to specific UL resources that may be used to activate the system information. The WTRU may request the transmission of access tables using those UL resources. In one embodiment, WTRUs may be configured to report the TRPs in DTX (for example, using reserved system signatures). The network may determine the activation of TRPs based on a number of WTRU reports.

The WTRU may determine paging via system signatures. Pre-defined system signatures may be used for the paging procedure. This may include the presence of a paging message for one or more WTRUs to be indicated via a pre-defined system signature. Such an indication may be of different levels, which may be for example a frame level or subframe level. Time/frequency resources for actual paging message transmission may be indicated via a predefined signature, and such resources may, for example, be defined in the access table. UL time/frequency resources for a paging response/preamble transmission may be indicated via a predefined system signature, and such resources may be defined in the access table.

The WTRU may determine an indication of an association with a specific node in the assistance layer. The WTRU may consider one or more TRPs in an assisted layer transmitting same system signatures to be associated with the same node in the assistance layer. For example, a group of 5Gflex TRPs transmitting a same reference signal may be associated with the same LTE-Evo macro eNB. The WTRU may determine the specific LTE-Evo macro eNB.

The WTRU may determine an indication of a control channel characteristic/property that may be used. The WTRU may determine one or more of the following characteristics/properties associated with the control channel from the system signature:

Type of control channel: the WTRU may determine the type of control channel based on the system signature. For example, the WTRU may determine the presence of a control channel associated with more than one TRP based on the presence of a predefined system signature. Similarly, the WTRU may determine the presence of a TRP specific control channel based on the presence of a TRP specific system signature. The WTRU may determine the presence of a SOM/slice specific control channel based on the presence of a system signature specific to that SOM/slice. The WTRU may determine whether the control channel is beam-formed or not based on a presence of a predefined system signature. The WTRU may determine the presence of an enhanced coverage control channel (for example, with repetition in time and/or frequency) based on the presence of a pre-defined system signature.

Location of the control channel: WTRU may obtain the location of the control channel based on the relative location of the system signature. For example, the control channel may be placed at a predefined offset in terms of time (for example, symbols) and/or frequency (for example, sub-carrier offset, RB offset, etc.)

Length/size/bandwidth of the control channel: the WTRU may determine the size of the control channel (for example, in terms of a number of OFDM symbols) as a function of the system signature. For example, a predefined mapping may exist between the system signature sequence and a number of OFDM symbols carrying the control channel. Similarly, the WTRU may determine the bandwidth of the control channel either explicitly based on a pre-defined system signature or implicitly based on resources occupied by the system signature.

The WTRU may determine an identity related to the TRP or TRPG. The WTRU may identify and/or distinguish a TRP from other TRPs based on the received system signature. A WTRU may identify two or more TRPs being part of the same group based on the presence of a common system signature. The WTRU may identify and/or distinguish a TRPG from other TRPGs based on the received system signature. The WTRU may consider a TRP belonging to two or more TRPGs when it receives two or more TRPG specific system signatures from the same TRP. In some embodiments, a system signature may comprise two or more parts, for example a first part that is TRPG specific and a second part that is TRP specific.

The WTRU may determine a specific network slice wherein each RAN slice is associated with a set of radio resources, which may be dedicated or shared with other RAN slices. The WTRU may identify the parts of radio resources associated with a specific RAN slice based on the presence of a system signature associated with that slice. In one example, the WTRU may determine the bandwidth allocated to a specific RAN slice based on the bandwidth occupied by the system signature associated with that slice or based on a function of system signature sequence associated with that slice. The WTRU may determine if the one or more subframes and/or TTIs and/or OFDM symbols are associated with a specific RAN slice based on the presence of a predefined system signature in those subframes and/or TTIs and/or OFDM symbols. The WTRU may obtain the mapping between the system signatures and associated RAN slice, which may be for example, obtained from an access table or a WTRU specific configuration. Similar mechanisms may be used to associate a SOM or a signal structure with a system signature.

The WTRU may determine a specific numerology. This may include situations where the WTRU determines one or more parameters associated with the numerology as a function of the system signature. For example, the one or more parameters associated with the numerology may include but are not limited to: TTI length, number of symbols per TTI, bandwidth, subcarrier spacing, and cyclic prefix. In one example, a set of supported or allowed numerology configurations may be predefined and mapped to unique system signatures using an access table.

The WTRU may determine a specific frame structure that may be used. For example, the WTRU may determine the duplex mode or a frame structure type based on the received system signature. For example, a predefined system signature may be reserved to indicate one of TDD duplex mode, FDD duplex mode, half duplex mode, or full duplex mode, etc. The WTRU may additionally determine the type of one or more physical channels within a frame structure as a function of the presence of predefined system signatures. For example, a first symbol in a subframe may carry a signature that describes the rest of the frame, whether the frame is almost blank or if the frame is self-contained (i.e. there is support for transmissions in both the uplink and downlink multiplexed in time within the same subframe) and a specific format of the self-contained frame (i.e. DL control and/or data followed by UL control and/or data, UL data and/or control followed by DL control and/or data, etc.). Similarly, the WTRU may determine the subframe number, slot number, system frame number, etc. as a function of the system signature.

The WTRU may determine an indication of the network capabilities/features that may be used. For example, in legacy systems, the WTRU may be required to decode system information to determine the network capability, i.e. if the network supports one or more features. In next generation systems, the WTRU may directly determine one or more network capabilities based on the presence of one or more system signatures. This may reduce the latency and overhead, as the WTRU may not be required to receive and decode the system information from each TRP. For example, predefined system signatures may be reserved to indicate support for eMBMS, D2D, above 6 GHz carrier, etc. Additionally, a first group of system signatures may be reserved to indicate the network support of an initial set of 5G features (for example, phase1) and a second group of signatures may be reserved to indicate network support of an extended set of 5G features (for example, phase2). In one example, WTRUs with phase2 capability may perform preferential access towards TRPs with the second group of signatures.

The WTRU may determine a specific deployment or mode of operation that may be used. The WTRU may distinguish between the LTE-assisted 5GFlex transport channels and the standalone 5GFlex operation based on system signatures. Predefined system signatures may be placed in an LTE frame structure to indicate the presence of one or more 5GFlex physical channels. Similarly, a different set of system signatures may indicate a standalone 5GFlex operation. WTRU logic to perform initial access may be a function of the system signatures that are received within a frame. The WTRU may differentiate between a macro TRP and a low power TRP based on the predefined system signature transmitted from the TRPs.

The WTRU may determine the suitability of the TRP or TRPG. The WTRU may determine the suitability of a TRP or group of TRPs using a quality metric based on measurements performed using a system signature. Such measurements may be used for selection of TRP/TRPGs for initial access, for handover, or to perform idle mode paging monitoring.

The WTRU may determine a specific version (with respect to a predefined set of information) of system information that may be used. Each system signature may be associated with a predefined set of system information. Upon reception of such a system signature, the WTRU may apply the associated configuration in the system information.

The WTRU may determine the size and the format of the initial access message (e.g., msg1, msg3 etc.) as function of a system signature.

The WTRU may determine that the timing of system signatures may be used as a DL timing reference.

The WTRU may determine that the received power of system signatures may be used as DL pathloss references.

The WTRU may determine the location of an access table based on the received system signature. For example, the WTRU may determine the presence and format of a data channel carrying the access table based on the system signature. The WTRU may not need to know or decode the control channel in order to receive the access table information. The access table information may be, for example, transmitted with a predefined MCS. In one example, the WTRU may determine the redundancy version for the access table transmission using the received system signature.

The WTRU may determine linked bands/DL/UL frequencies (for example, the relation between system signature and placement and bands of operation).

The information contained in the transmission of system information may be structured in a specific manner. For example, such information may be received as a list of elements. Each element may represent a modular element, for example, in the access table. System information in the access table may be grouped into different sub-tables.

The information in such elements may be grouped based on characteristics including but not limited to the following:

Specific to a physical node: for example, a TRP specific sub-table, TRPG specific sub-table. For example, the WTRU may determine that parameters associated with one such element may be associated with the configuration a distinct and/or dedicated MAC instance.

Specific to a RAN slice: for example, the WTRU may determine that parameters associated with one such element may be associated with the configuration and/or availability of one or more specific type(s) of processing (for example, L1, L2) and/or a specific type and/or level of supported QoS.

Specific to a service (eMBB, ULLRC, mMTC): for example, the WTRU may determine that parameters associated with one such element may be associated with the configuration and/or availability of one or more specific type(s) of control channel, physical data channel (uplink and/or downlink), and/or type of supported QoS.

Specific to a SOM: for example, the WTRU may determine that parameters associated with one such element may be associated with the configuration and/or availability of one or more specific type(s) and/or set of physical resources.

Specific to a feature/capability (for example, MBMS, D2D, and the like): for example, the WTRU may determine that parameters associated with one such element may be associated with the configuration and/or availability and/or support for one or more specific types of (for example, WTRU-related) capabilities or combinations thereof. For example, the WTRU may determine that one or more sets of features are supported by the network using the associated access parameters.

Specific to a layer (for example, macro sub-table, small cell sub-table): for example, the WTRU may determine that parameters associated with one such element may be associated with the configuration and/or availability and/or support for one or more specific types of radio access method(s), which for example, may be based on system information broadcasts and RRC connectivity, signature-based access, or other methods.

Specific to a component carrier (Pcell sub-table, PScell sub-table, Scell sub-tables): for example, the WTRU may determine that parameters associated with one such element may be associated with the configuration and/or availability and/or support for one or more specific types of aggregation of radio resources. For example, an access method whereby the outcome of the L1 access (for example, preamble transmission and/or random access) may result in a plurality of associations each with different carriers and/or TRPs.

Group IEs: Group IEs that are cell specific separately from IEs that are layer specific (or common to more than one TRP).

Specific to a mobility set and/or an access set (for example, to a group of one or more TRPs that share at least some aspects): such aspects may include procedures and/or functions such as, for example, support for coordinated scheduling, COMP, carrier aggregation, MBMS area, common access rights, seamless mobility within TRPs of such a group, common security context, WTRU context availability/sharing for all TRPs of such a group, and the like. For example, this may be applicable when all TRPs in a set are controlled by the same central entity and/or are connected to each other and/or to the central control entity by interfaces enabling such coordination (for example, an ideal interface). For example, the WTRU may determine that parameters associated with one such element may be associated with the configuration and/or availability of one or more specific procedure(s), for example, such as L1/PHY mobility.

Specific to a type of radio access technology (for example, LTE, 5gFLEX): for example, the WTRU may determine that parameters associated with one such element may be associated with the configuration and/or availability and/or support for one or more specific types of radio access and/or access methods. For example, the WTRU may determine that the associated radio access procedure uses legacy LTE methods (or an evolution thereof) for standalone access. For example, the WTRU may determine that the associated radio access procedure uses the 5gFLEX procedures for standalone access. For LTE CP/PHY+5gFLEX PHY superposition, DC or CA, for example, the WTRU may determine that the associated radio access procedure uses legacy LTE methods (or an evolution thereof) such that the WTRU may first establish an RRC Connection for the subsequent configuration of one or more 5gFLEX TrCH(s) and/or physical data channel(s). The WTRU may possibly further determine whether such a configuration is for the same carrier (for example, by superposition of additional physical channels), a different carrier (for example, by carrier aggregation principles) and/or separate MAC instances (for example, using different schedulers by dual connectivity principles). For LTE CP+5gFLEX PHY substitution, for example, the WTRU may determine that the associated radio access procedure uses legacy LTE methods (or an evolution thereof) for the L3/RRC Control Plane following an access using the 5gFLEX procedures, for example, based on 5gFLEX access tables, signature detection, transmission over 5gFLEX TrCH(s), and/or physical access/data channel(s). These elements may be further grouped together respectively. Such groups may be further separated from each other.

Figure 9:
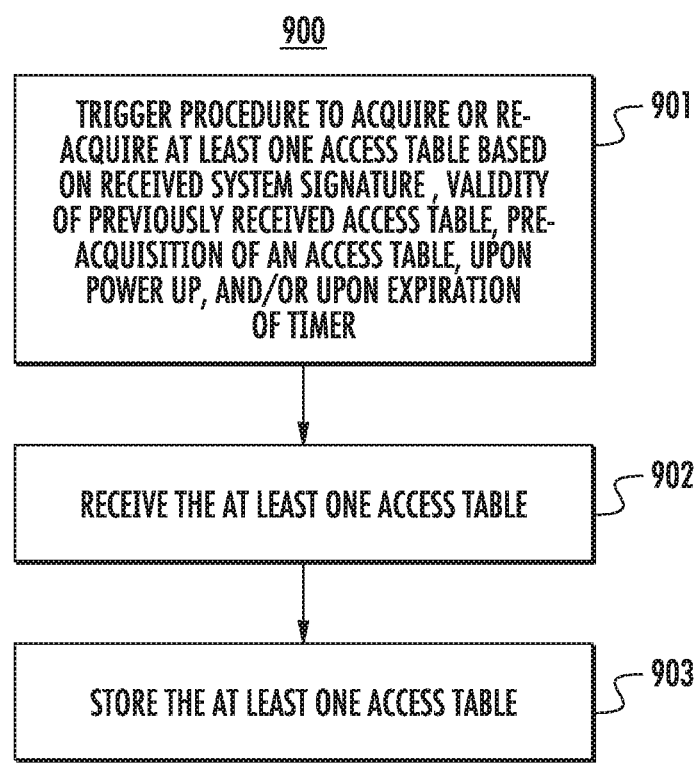
FIG. 9 is a flow diagram of an example process for detecting/acquiring system information via access tables.

FIG. 9 is a flow diagram of an example process for detecting/acquiring system information via access tables 900 that may be performed in the example system 700 described above and used in combination with any of the embodiments described herein. While each step of the procedure 900 in FIG. 9 is shown and described separately, multiple steps may be executed in a different order than what is shown, in parallel with each other, or concurrently with each other. The process of FIG. 9 is performed by a WTRU for exemplary purposes, but it may also be performed by any node operating in a wireless communications system such as a TRP, eNB, 5gNB, AP, or base station. In the example of FIG. 9, a WTRU, via the transceiver or transmitter of the WTRU as described above, may trigger a procedure to acquire or reacquire at least one access table 901 based on a received system signature, an aspect associated with the validity of a previously received access table, for pre-acquisition of an access table, upon power up, and/or upon expiration of a timer.

For example, the WTRU may receive a system signature periodically to stay up to date with the system configuration. The WTRU may trigger a procedure to acquire or reacquire the at least one access table 901 when the WTRU receives an unknown system signature. For example, the WTRU may declare a received system signature as unknown when the WTRU does not have a valid access table associated with the system signature stored in its memory. If the WTRU receives an unknown system signature, it may perform actions including but not limited to the following: reporting the unknown system signature to the currently associated TRPs or TRPGs and/or reporting the unknown system signature to the assistance layer, triggering an on-demand access table transmission procedure, or considering the unknown system signature as being from inaccessible transmitter.

In another example, the WTRU may trigger a procedure to acquire or reacquire the at least one access table 901 when the WTRU receives a reserved signature, which is special signature that may be reserved to indicate a change in the access table.

In another example, the WTRU may trigger a procedure to acquire or reacquire the at least one access table 901 when the WTRU determines that a measurement related and/or associated with a system signature and/or to the reception of an access table is no longer of sufficient quality. In this example, the validity of an access table may be a function of a reception quality of the transmitted access table.

In another example, a WTRU may trigger a procedure to acquire or reacquire the at least one access table 901 after determining that one or more entries in the stored access table are no longer valid. The validity of the access table may be determined by a change in a value tag when the value tag associated with the stored access table information is different from the network broadcasted value tag. The value tag may be defined at different levels of granularity. The value tag may be associated with a whole access table, and/or sub-table, and/or group of entries, and/or a specific entry in the table. When reacquiring an access table, the WTRU may reacquire only the relevant portion of the access table according to the granularity of the value tag. The WTRU may receive the value tag used to determine the validity of the access table in several ways, including but not limited to the following: as a separate entry in the access table, in a MAC control element, in a physical channel reserved to carry value tag information, using one or more properties of the synchronization channel or demodulation reference signal, and/or in a paging message.

In another example, a WTRU may trigger a procedure to acquire or reacquire the at least one access table 901 via pre-acquisition of the access table. In this example, the WTRU may pre-acquire the access table associated with one or more system signatures, before actually receiving the one or more system signatures. WTRU may pre-acquire the access table using one or more of the following methods:

The WTRU may determine the need to acquire or re-acquire the access table based on its location and proximity to one or more system signatures. For example, the WTRU may be configured with a list of system signatures that are active in a geographical location defined by the location area, routing area, RAN area, or relation based on positioning reference signals, or other means to obtain location information (for example, GPS/GNSS).

As part of handover information, the WTRU may receive a list of access tables from the source cell, which may correspond to one or more system signatures in the target cell.

The WTRU may receive parts of access table information during a connection release procedure. The WTRU may use the access table information in the idle mode for example.

The WTRU may pre-acquire access table information associated with one or more system signatures that are turned off. These system signatures may correspond to one more TRPs in a DRX state and/or one or more inactive services within the active TRPs.

In another example, a WTRU may trigger a procedure to acquire or reacquire the at least one access table 901 upon power up. In this example, the WTRU may acquire the access table upon power up when, a stored access table is empty, and/or the WTRU does not have a valid access table associated with the received signature.

In another example, a WTRU may trigger a procedure to acquire or reacquire the at least one access table 901 upon expiry of a timer. In this example, the WTRU may acquire or re-acquire the access table upon expiry of a periodic refresh timer.

After triggering a procedure to acquire or reacquire the at least one access table 901, the WTRU may receive the at least one access table 902. The WTRU may detect and receive the at least one access table that includes system information using several methods. For example, access table transmissions may be associated with a separate logical channel and be mapped to a transport channel that may include one or more of the following transmission characteristics:

The periodicity of the transmission of an access table may be relatively long (for example, up to 10240 ms). The periodicity also may be longer than the periodicity of the transmission of a system signature (for example, in the range of 100 ms).

Different parts of the access table (for example, sub-tables) may be transmitted with different periodicity based on the order of importance to regular WTRU operation. For example, a sub-table carrying information regarding the accessibility/PLMN information or initial access information may be transmitted more frequently than others.

Various modes of access table transmission may also be implemented. The WTRU may receive the access table information associated with an assisted layer from the assistance layer. For example, the WTRU may receive the access table information for a 5gFLEX small cell layer from a LTE-Evo macro cell using methods including but not limited to the following: a type of system information in the assistance layer (for example, a SIB in the macro cell for the group of small cells/TRPG), a SC-PTM mode in the assistance layer, and/or a shared data channel (e.g., PDSCH) as dedicated WTRU information. In another example, the WTRU may combine transmissions from the assistance layer and assisted layer to form the complete access table. For example, WTRU may receive a baseline access table from the LTE macro layer and only the delta changes on top of the baseline table from the 5gFLEX small cell layer.

For multi-TRP coordinated broadcast mechanisms (single frequency mode), the WTRU may receive the access table information from more than one TRP on the same time/frequency resource. The WTRU may consider such access table information being applicable to more than one TRP, which may be over a geographical region. A separate antenna port may be defined for access table transmission. The WTRU may perform layer mapping and precoding assuming that a single antenna port is used. The access table transmissions may use an extended cyclic prefix. Multi-TRP coordinated broadcast channel may be associated with a dedicated reference signal that is different from a cell specific reference signal.

For TRP specific transmission, an access table may be transmitted within the coverage of a single cell/TRP using a shared or common data channel or broadcast channel. The downlink control messages corresponding to access table transmissions may be identified by a reserved RNTI. For example, at least two RNTIs may be used to identify different sub-tables of an access table. Alternatively, the access table may be transmitted using a Single Cell Point to Multipoint transmission (SC-PTM) within a TRP.

A hybrid mechanism may also be implemented for transmission of an access table. The WTRU may receive RAN area/layer specific parts of an access table using a multi-TRP mechanism, and cell specific parts of an access table may be received via a broadcast or unicast mechanism. For example, the WTRU may differentiate the modes of transmission as a function of system signatures. For example, different system signatures may be reserved for a specific mode of access table transmission.

Access table transmissions may be multiplexed with other logical channels in the same subframe/TTI. Access table transmissions may also be self-contained, i.e. associated with a dedicated synchronization signal and/or a demodulation reference signal. The resource elements carrying the demodulation reference signal may be time and/or frequency multiplexed with the resource elements carrying the access table information. The WTRU may obtain time and/or frequency synchronization using the synchronization signal dedicated for access table acquisition. Some examples of the synchronization signals include but are not limited to preambles and/or sequences, functions of system signatures, or predefined sequences reserved for an access table, unique word, etc. In another example, the dedicated synchronization signal may be different from a cell specific synchronization signal. The dedicated synchronization signal may transmit on demand, i.e. transmitted only when there is an associated access table transmission active. The synchronization signal may be located at an offset from the access table transmission. The WTRU may detect the presence of the access table from the presence of a dedicated synchronization signal associated with the access table transmission. The maximum transport block size for an access table transmission may be restricted to be less than a threshold to accommodate different WTRU capabilities. WTRUs in coverage limited scenarios or RF bandwidth restricted scenarios may receive additional repetitions of access table transmissions to increase SNR and robustness.

After receiving the at least one access table 902, the WTRU may store the at least one access table 903 associated with one or more system signatures in memory. The memory of the WTRU may include but not is not limited to non-removable memory 130, removable memory 132 described above with respect to FIG. 1B. When storing the at least one access table 903, the WTRU may store a base line configuration, which has common values for most of the system, parameters and then may only store the delta configuration for each system signature. Additionally, the WTRU may receive a long term configuration that may be WTRU specific, to be used in cells/TRPs where the WTRU visits frequently.

Assuming that the WTRU memory may hold access tables corresponding at most n system signatures, the WTRU may use one or more of the following algorithms to make room for an access table corresponding to a newly received system signature when its memory is full (already holding n signatures):

The WTRU may keep track of how often the access table information was retrieved for each system signature. The WTRU may overwrite the nth most frequently used system signature memory with the newly received system signature.

The WTRU may keep track of the time spent (or time of stay) in each cell/area associated with the signature. The WTRU may overwrite the system signature where the least amount of time was spent with the new signature.

The WTRU may keep track of most recently received system signatures. The WTRU may overwrite the least recently used system signature with the new system signature.

The WTRU overwrite the oldest signature (in terms of when it was written into the memory) memory with the new signature information (i.e. First in First Out).

Before initiating the procedure 900 of FIG. 9 to acquire or re-acquire an access table, the WTRU may first determine that it has access rights to the cell (e.g., PLMN ID, CSG, access barring etc.). The WTRU may then ensure that it has valid initial access parameters associated with the system signature(s), before any uplink transmission in the cell. These parameters may be provided by one or more entries in the access table.

The WTRU may determine the transmission characteristics of the access table including the resources used for access table transmission in terms of time, frequency, space and/or code, using one or more of the following methods:

The WTRU may determine that scheduling modes for the access table may be periodic or on-demand. For a periodic scheduling mode, parts of the access table may be transmitted at a predefined periodicity. For example, only the absolute minimum required for initial WTRU access may be transmitted periodically. In this example, only the UL resource configuration for initial access PLMN ID, Access restriction, Non-critical extensions etc., may be transmitted. Such periodic transmissions may not be limited to just one TRP and may be common parameters applicable to two or more TRPs. The on-demand solution may be considered as a leaner approach compared to sending all the system parameters for all TRPs all the time. Parts of an access table may not be transmitted periodically and only transmitted based on a request by the WTRU. A WTRU triggered activation of the access table transmission may include WTRUs requiring access table information be configured to transmit an explicit access table activation request/interest notification message. The WTRU may use UL resources reserved to trigger on-demand access table transmissions. (e.g., UL RACH resources or UL signal). In an example, the WTRU may request specific parts of the access table by transmitting detected a system signature and/or a value tag and/or a reason/cause code. The WTRU may receive a RAR related message that carries a DL grant carrying the requested access table information. There may be timing relations between on-demand requests and SIB transmission (with or without PDCCH). Alternatively, the WTRU may receive a paging like message that carries information about the on-demand access table transmission. Such a paging mechanism may be beneficial for WTRUs to receive the access table opportunistically (i.e. WTRUs that did not transmit an access table request). In a hybrid scheduling mode, the access table transmission may dynamically switch between on-demand and periodic modes. The hybrid method may allow a flexible periodicity for the access table transmission ranging from frequent transmission to completely on-demand transmission. The periodicity may be determined by the number of WTRU requests (for example, WTRUs may be configured to report TRPs in DTX using reserved signatures), network listening (for example, TRPs may listen to other TRP transmissions or WTRU transmissions), based on cell load (for example, it may be efficient to do periodic transmission if the number of WTRUs in the cell are high), based on assistance layer, based on active SOM/Services, based on inter-TRP coordination (e.g., over X2), based on RRM aspects (e.g., resource utilization, time of day etc.), etc.

The WTRU may determine the DL resources for access table transmission based on one or more of the following methods:

A paging related message that indicates the presence of access table information. Additionally, the paging message may also carry DL resource grant with the scheduling information of access table transmission.

A downlink control information (DCI) in a control channel (for example, PDCCH, EPDCCH etc.).

An implicit relationship to the time/frequency resources occupied by the system signature, and a dedicated control channel common to a plurality of TRPs (for example, for single frequency mode of transmission).

The WTRU may request one or more parts of the access table that contains parameters related to a particular connection procedure. The network may then, in addition to transmitting the requested connection procedure parameters, allocate resources for connection procedure (i.e. piggyback the access table request and connection request procedure). Alternatively, the WTRU may include specific reasons for a connection request (for example, MO data or signaling), and the network may then provide the relevant SIB to the WTRU and additionally allocate resources for the connection procedure. Additionally, the WTRU may include a value tag in the connection request.

Figure 10:
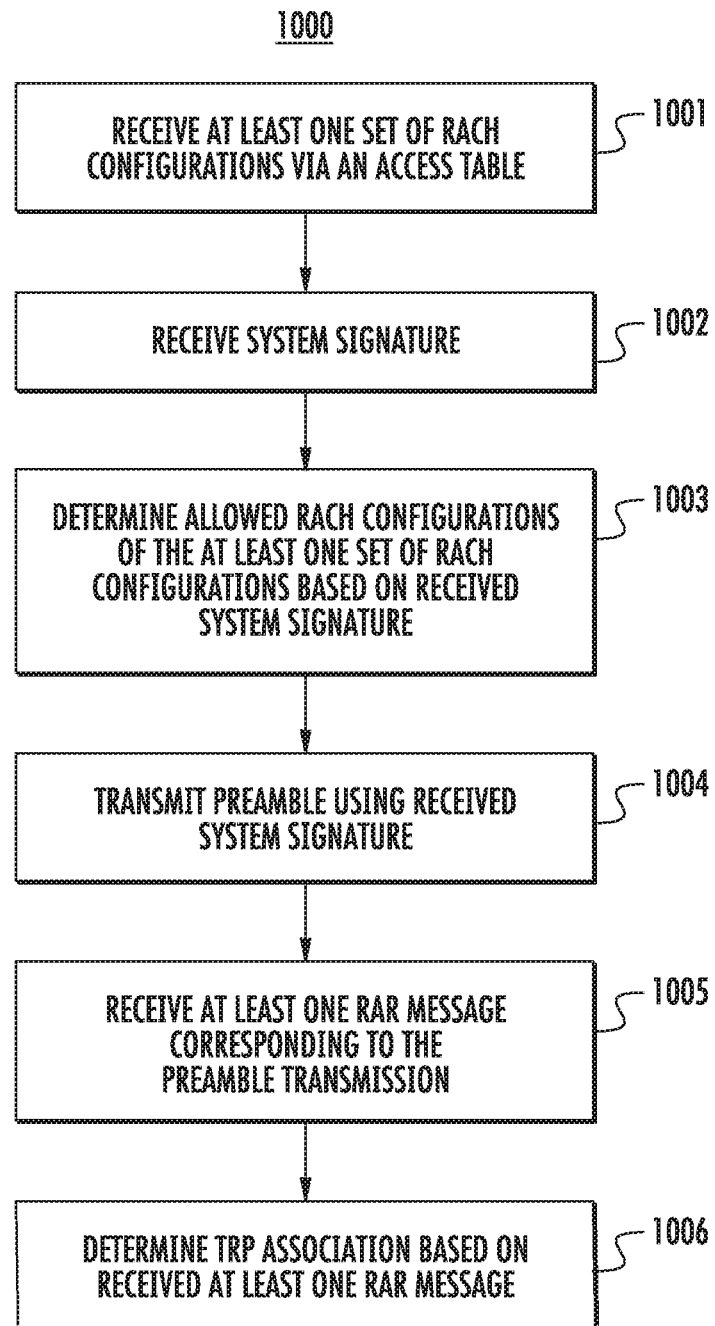
FIG. 10 is a flow diagram of an example random access procedure using initial access using system signatures or signature sequences.

FIG. 10 is a flow diagram of an example random access procedure using initial access using system signatures or signature sequences 1000 that may be performed in the example system 700 described above and used in combination with any of the embodiments described herein. While each step of the procedure 1000 in FIG. 10 is shown and described separately, multiple steps may be executed in a different order than what is shown, in parallel with each other, or concurrently with each other. The process of FIG. 10 is performed by a WTRU for exemplary purposes, but it may also be performed by any node operating in a wireless communications system such as a TRP, eNB, 5gNB, AP, or base station.

In the example of FIG. 10, a WTRU, via the transceiver or receiver of the WTRU as described above, may receive at least one set of RACH configurations via an access table 1001 received in accordance with any of the methods described herein. As a result, the WTRU may be configured with one or more sets of potential RACH configurations via the access table. RACH configurations may include a preamble configuration (for example, number of preambles, preamble grouping, preamble selection criteria, etc.), power ramping parameters, RAR window configuration, retransmission configuration, PRACH configuration (for example, RACH occasion, time/frequency resources, RACH format, etc.), retransmission, etc. Additionally, the WTRU may distinguish two different categories of RACH configurations, which may each be associated with one TRP or associated with a plurality of TRPs.

The WTRU may receive a system signature 1002. The WTRU may then determine the allowed RACH configurations of the at least one set of RACH configurations based on the received system signature 1003. In some embodiments, the WTRU may select a subset of RACH configurations among a plurality of allowed RACH configurations based on criteria including but not limited to the following:

The trigger for random access: the WTRU may determine the RACH configuration based on whether the msg3 has signaling or data PDUs. Each SOM may be associated with a specific RACH configuration. The WTRU may determine the RACH configuration according to the SOM for which the data becomes available. Each network slice may be associated with a specific RACH configuration. The WTRU may determine the RACH configuration according to the slice for which the data becomes available.

WTRU state: the WTRU may be in the ACTIVE/CONNECTED state. For example, the WTRU may be already connected to the network and upon wake up from DRX, the WTRU may select the RACH configuration associated with the serving TRP. Alternatively, the WTRU may perform a RACH procedure in response to a network trigger (for example, RACH order). In this case, the WTRU may determine the network node that triggered the RACH order and select the RACH configuration associated with the network node. The WTRU may be in the PASSIVE/IDLE state. For example, the WTRU may have no active connections to the network node and/or during a network node selection procedure. The WTRU may select a RACH configuration associated with multiple TRPs and perform TRP selection based on RACH procedure.

WTRU coverage status: the WTRU may choose a RACH configuration based on its coverage status, for example normal coverage or needing enhanced coverage.

Measurement results: the WTRU may select one or more TRPs based on measurements on one or more system signatures and/or reference signals. The WTRU may then determine the RACH configuration associated with selected TRPs.

WTRU capability: the WTRU may receive different RACH configurations indicative of network node capability. For example, a WTRU with expanded features such as a phase2 5G WTRU may prioritize a RACH configuration associated with TRPs with 5G phase2 capability, whereas a WTRU with limited features such as a phase1 5G WTRU may select RACH configurations associated with LTE assisted TRPs.

DL path loss.

Size of data and/or signaling PDU (for example, MSG3).

The WTRU may be preconfigured with different RACH resource sets, and each set associated with one of more of the following properties: TRP specific RACH resources reserved for a point to point RACH procedure; RACH resources specific to two or more TRPs reserved for a point to multi-point RACH procedure. The multi-point RACH resource configuration may include whether the WTRU waits for a first RAR (in the case of TRP coordination) or whether the WTRU waits for the whole RACH window (in case of WTRU based RAR selection).

Referring to FIG. 10, the WTRU may then transmit a preamble using the received system signature 1004. For example, during preamble transmission, the WTRU may use the system signatures for initial power setting and timing reference (for example, a measurement based on the reception of the system signature). The WTRU may indicate some form of the identity of the WTRU using the Msg1/Preamble transmission, wherein the WTRU ID may be one of: ID of the WTRU specific to a serving TRP (for example, RNTI); ID of the WTRU specific to a group of TRPs (for example, allocated by a central unit); RNTI of the WTRU allocated in the assistance layer (for example, in the LTE-Evo macro eNB); temporary NAS identifier of the WTRU; and an Explicit RAN level WTRU context identifier (for example, unique within a logical RAN area).

Preamble selection and/or PRACH resource selection for use in the preamble transmission may be a function of the WTRU ID. The WTRU may select the preamble and RACH resource based on a hashing function. The hashing function may map the WTRU ID to a specific PRACH resource. The number of WTRUs may typically be greater than available PRACH resources and may result in a collision. A WTRU may randomize the collision by using, for example, one or more following parameters as input to the hashing function: WTRU identity, an ID related to time domain (for example, subframe number, symbol number where the RACH is transmitted), an ID related to frequency domain (for example, starting subcarrier index, RB number, bandwidth region, etc.), cell ID/System signature, and retransmission count.

The WTRU may transmit additional information along with the PRACH transmission. For example, the WTRU may attach a small payload or MAC control element along with the RACH preamble transmission that carries additional information such as an explicit WTRU ID or WTRU context identifier. In another example, the WTRU may convey additional information by selection of a specific RACH resource. For example, the WTRU may select RACH resources associated with multiple TRPs to convey the need for network node selection. In another example, the WTRU may select a RACH configuration associated with resource repetition to convey the need for enhanced coverage. In yet another example, the WTRU may transmit an indication of the WTRU's needs (for example, size of the data packet, type of service, type of signal structure requested).

The preamble transmissions of the WTRU may be associated with a DL system signature, which may be associated with one or more MAC instances in the network. The RACH resources (for example, time, frequency, preamble, etc.) may be associated with one TRP or group of TRPs. The WTRU may determine the RACH configuration associated with a signature from the access table. Alternatively, parts of the RACH configuration may be implicitly determined by one or more aspects of the system signature itself (for example, relative offset in time/frequency, bandwidth, etc.).

The WTRU may be configured with a common RACH configuration irrespective of the number of TRPs listening to a RACH on those resources. The WTRU may be transparent to the number of network nodes that receive and process the UL random access message.

In another example, the WTRU may indicate to the network if the RACH is targeted towards one TRP or multiple TRPs. The WTRU may provide such an indication by either including additional information with the PRACH transmission, for example, a MAC control element and/or attaching a unique word to an OFDM symbol and/or as a small payload and/or selection of RACH resource group and/or preamble and/or time/frequency resource selection.

The retransmission behavior of the WTRU may be a function of the RACH resource selection. For example, each RACH resource set may be associated with a different retransmission characteristics/parameters including but not limited to the maximum number of retransmissions allowed, a length of the response window, a contention resolution timer, etc. The WTRU may apply different RACH configurations for retransmissions compared to initial transmission. The WTRU may be configured with additional RACH opportunities for retransmission. For example, the WTRU may consider additional pre-configured RACH resources for transmission, which may be reserved for retransmission only. The WTRU may select a RACH configuration associated with multiple TRPs after a preconfigured number of attempts on a TRP specific RACH have expired. For example, the initial transmission of the WTRU may be specific to a TRP, and upon failure (for example, no RAR or contention resolution timer expiry), the WTRU may target the retransmission to more than one TRP to increase possibility of a success.

Referring to FIG. 10, the WTRU may receive at least one RAR message corresponding to the preamble transmission 1005. The WTRU may receive a RAR corresponding to each RACH transmission. RARs from the same TRP (for example, to provide enhanced coverage) or RARs from different TRPs (for multi-connectivity) may be separated in time and/or frequency, but within a predefined RAR window. The WTRU may be required to receive all possible RARs within the RAR window and not stop after the first RAR. The RAR window size may be function of number of TRPs involved in the RACH procedure. Or a default RAR window size may be defined and a bitmap in RAR indicate that it is the last RAR message within the window. The WTRU may also receive different RAR messages (formats/contents) based on selection of RACH configuration. The WTRU may receive information including but not limited to the following in the RAR message:

The WTRU may receive a synchronization signal specific to TRP in the RAR message. The WTRU may perform synchronization with the preferred/selected TRP based on the synchronization signal received within the RAR from that TRP. WTRU may consider the received RAR message as a DL timing reference for initial access towards that TRP.

The WTRU may receive a TRP identity or an identity specific to group of TRPs in the RAR message.

The WTRU may receive a number of allowed associations in the RAR message. The WTRU may limit the max number of associations according to a value signaled in the received RAR message.

The WTRU may receive a reference signal for measurement and selection of TRPs in the RAR message. The WTRU may use either a combination of measurements made on system signatures and reference signals included in the RAR or the measurements made on reference signals included in the RAR for selection of TRP(s)

The WTRU may receive a last RAR indication in the RAR message. If the last RAR indication is false, the WTRU may wait for one or more RAR messages within the current RAR window else the WTRU may stop listening to RAR messages and assume an end of the RAR window at the subframe carrying the RAR message with last RAR indication as true. Upon the end of the RAR window, the WTRU may perform initial access procedures based on received RAR messages within the window.

The WTRU may receive additional system information in the RAR message. For example, the RAR message may explicitly include a dedicated configuration to perform further initial access or a connection establishment procedure. Alternatively, the RAR message may implicitly indicate such a configuration via additional signatures or a DCI for the transmission of additional system information.

The WTRU may transmit additional context information if the RAR message includes a request for additional WTRU context information. This may happen for example, when the WTRU context cannot be retrieved or is unknown from the preamble or the WTRU ID is ambiguous (i.e. there exists more than one WTRU context for a given WTRU ID).

The WTRU may receive a redirection message that may be included in the RAR message. For example the WTRU may be redirected to a different TRP which was turned OFF earlier and/or redirected to different layer (for example, a macro layer or small cell layer), different RAT (for example, to a sub 6 GHz or above 6 GHz RAT) or a different spectrum (for example, unlicensed spectrum). The redirection message may additionally provide assistance information, such as timing assistance (for synchronization to redirected TRP), initial access assistance (for example, a dedicated preamble and/or RACH resources), etc.

The WTRU may receive an activation message that may be included in the RAR message. For example, an identity or configuration of a new WTRU specific SOM or slice which may be activated based on WTRU request.

The WTRU may receive a demodulation reference signal that may be included in the RAR message to decode it.

The WTRU may receive an L3 control message to provide additional information (for example, a dedicated configuration, a WTRU specific control channel configuration, etc.) that may be included in the RAR message.

The WTRU may receive information on the set of TRPs that coordinated to transmit the RAR in the RAR message.

The WTRU may receive information on the TRPG in the RAR message, which may be associated with the TRP transmitting the RAR.

The WTRU may receive information indicating whether handover was successfully performed in the RAR message. For example, an indication may be included to the WTRU to drop connectivity to a source TRP.

The WTRU may receive assistance information for the WTRU to begin monitoring other TRPs/TRPGs in the RAR message.

The WTRU may receive an indication in the RAR message that previous grants for PUSCH (for example, for SPS) are still valid.

The WTRU may receive a timing advance in the RAR message that is specific to a TRP or a group of TRPs in a single RAR message.

The WTRU may receive an UL grant specific to one TRP or possibly different UL resources for more than one TRP in the RAR message.

The WTRU may receive a temporary RNTI in the RAR message.

Referring to FIG. 10, the WTRU may determine TRP association based on the received at least one RAR 1006. WTRU may associate to one or more TRPs as a function of the number of RAR messages received and the selection criteria applied by the WTRU. The selection criteria may include one or more of the following: based on measurements over the RS transmitted with the RAR, based on measurements made on a previous RS (for example, the WTRU may pre-rank them beforehand), a combination of measurements made with a previous RS, an RS transmitted with the RAR, ranking metric included in the payload of the RAR, earliest timing using the timing advance value in RAR, and timing of the RAR transmission.

The WTRU may determine association with at least one TRP based on this random access procedure. The WTRU may determine a number of TRPs to associate based on network configuration (for example, max number of connections may be configured in the access table), number of RAR messages that satisfy WTRU selection criteria, WTRU state (for example, the WTRU may be already connected to a serving TRP, and the WTRU may select the RAR received from the serving TRP), WTRU type of service/QoS (for example, ultra-reliable service may need connectivity to more than one TRP), WTRU mobility status (for example, a stationary WTRU may select one TRP, WTRUs with medium/fast mobility may select more than one TRP for seamless handover), WTRU capability (for example, the WTRU may be restricted by number of RF chains), and the type of physical channel (for example, for a beamformed random access the WTRU may select more than one TRP for increased robustness against link failure).

The WTRU may associate with a number of TRPs according to Min (network configured max connections, number of RAR messages satisfying WTRU selection criteria, supported max connections based on WTRU capability). WTRU may indicate the selection of TRPs to the network in one of the following ways: the WTRU may transmit the identities of selected TRPs in a control message (e.g., a L3 message or MSG3) in a common UL resource configured for all the TRPs; the WTRU may transmit a control message on the UL resources granted/configured by the RAR messages selected by the WTRU; and the WTRU may transmit the of selected TRPs in a control message (e.g., a L3 message) to the serving cell in assistance layer (e.g., LTE-Evo eNB).

The WTRU may identify the TRPs using one or more of system signature, system signature sequence, or identity of the TRPs included in the RAR message.

In one embodiment, TRPs may select the best RAR for the WTRU. The coordination between the TRPs may be distributed or centralized (for example, in a RAN central unit). The TRPs may exchange a suitability metric to determine the best TRP to serve the WTRU. The suitability may include one or more of SNR on the received PRACH for a specific TRP, load on TRPs, (for example, to achieve implicit load balancing), TRPs that already have a stored WTRU context (for example, based on historical association), TRPs matching WTRU capability, any other proximity criteria, and based on WTRU's needs, for example, UL or DL heavy, or transmission type.

In another embodiment, the WTRU may determine whether to perform WTRU based RAR selection or use network based RAR selection based on system signature, type of RACH resource, or based on explicit network configuration in access table. In another example, the WTRU may determine the need to perform WTRU based RAR selection based on the number of RAR messages; if only one RAR message is received the WTRU may consider it as network based selection. If WTRU receives more than one RAR message, then WTRU may perform RAR selection procedure as described above. In another example, the mode of RAR selection may be explicitly indicated in the RAR message itself, for example with a control bit.

A hybrid solution may be also used, wherein both a network based selection and a WTRU based selection are applied. In one example, TRPs may coordinate to down select two or more RARs among multiple RAR messages, and the WTRU may then select one or more TRPs for association. In another example, WTRUs may receive two or more RARs and transmit the identity of selected TRPs to the network. The network may then perform the second stage of selection and indicate the result to the WTRU in a new control message.

System signatures may be used for a rapid reconfiguration of WTRU specific resources. The WTRU may obtain one or more pre-configuration sets, as part of dedicated signaling or cell specific signaling. The pre-configuration set may include but is not limited to the following: a scheduling grant, another downlink or uplink control configuration, and/or a L2/L3 configuration. For example, a scheduling grant may include a pre-defined resource allocation granularity (for example, one, two or more resource blocks).

Each of the preconfigured sets may be mapped to one or more system signature resources (for example, sequences and time/frequency resources). The WTRU may be required to monitor the presence of system signatures.

The WTRU upon receiving one of the signatures may apply the associated pre-configuration. The WTRU may be configured to transmit an acknowledgement upon activation of the pre-configured resources. Alternatively, a short control message with a few bits of information may be used to activate one of the pre-configured sets.

A WTRU may be configured to utilize diverse access methods, wherein each access method is defined in terms of a specific combination of one or more of UL synchronization aspect, an arrangement related to the number of network nodes, a timing relation between a first uplink transmission and an actual data PDU transmission, a contention resolution and/or WTRU identification, UL resources used for access, a characteristic associated to HARQ processing, multiple access scheme, and assistance aspect.

For the UL synchronization aspect, the WTRU may select a different initial access procedure based on its UL synchronization status. For example, if the WTRU is required to be synchronized in the uplink before the data transmission, the WTRU may select a random access method to acquire UL synchronization and then perform data transfer. If the WTRU is not required to be UL synchronized, then WTRU may perform an asynchronous access method with relaxed time and frequency synchronization requirements. In one example, two different access methods may be defined based on how the synchronization is performed, WTRU based or network based.

An arrangement related to the number of network nodes, for example, may include a common configuration and/or UL resource across a group of TRPs that may be reserved for multi-point initial access, wherein WTRU uplink transmissions may be received by more than one TRP. Alternatively, the WTRU may first select a specific TRP (for example, based on suitability criteria) and then may acquire initial access parameters corresponding to that TRP and subsequently perform an initial access procedure towards the selected TRP.

For a timing relation between first uplink transmission and actual data PDU transmission, different initial access methods may be defined based on a relation between the first uplink transmission and the actual data PDU transmission. For example, the WTRU may include a portion of a data PDU or the whole data PDU in the first uplink transmission during initial access. Alternatively, the WTRU may transmit one or more signals/preambles before acquiring resources for actual data PDU transmission.

For contention resolution and/or WTRU identification, different initial access methods may be defined based on whether the WTRU should confirm that contention is resolved before data transmission, or the WTRU may transmit data before the actual contention resolution step. For example, the WTRU may initiate a contention based data transfer and if there was no contention, the WTRU may avoid the need for contention resolution step or alternatively the WTRU may be required to provide additional identification to resolve the contention or to identify the WTRU context, but this may happen after the actual data PDU transmission.

UL resources used for access includes one or more of following aspects a transmission scheme: single-carrier or multi-carrier scheme or a specific multi-carrier scheme such as OFDM, SC-FDMA, FBMC, UFMC, zero tail or the like; a parameter associated with a transmission scheme: for example, numerology aspects such as subcarrier spacing, symbol duration, cyclic prefix duration/guard length/zero tail length, transmit power (desired and/or compensation factor), spreading factor, bandwidth, etc.; frame structure, for example placement in time and/or frequency of one or more reference signal(s), synchronization signals(s), physical signal(s)/channel(s), TTI length, frame, subframe length, TDD configuration etc.; scheduling aspects of the resources including a maximum number of data bits allowed, for example, depends on the size of time frequency/code resources, MCS, repetition factor and or periodicity, number of retries, response window etc.; and other physical processing aspects, for example, spatial processing (precoding, transmit diversity, spatial multiplexing), beamforming (analog, digital or hybrid), etc.

For a characteristic associated with HARQ processing, different initial access methods may be defined based on whether HARQ is used for the data transfer and HARQ parameters such as a number of HARQ processes, relative timing between scheduling grants, transmission/reception of data and transmission/reception of HARQ feedback, etc.

For multiple access schemes, different initial access schemes may be defined based on the type of multiple access used, for example, resource spread multiple access, sparse code multiple access, contention based access, scheduled access, etc. Each initial access scheme may be associated with parameters specific to a multiple access scheme (for example, a random access power level, preamble, power ramping factor, max number of retransmissions etc., time frequency resource pattern, spreading code, sparse code etc.). In one embodiment, resources may be grouped according to the multiple access scheme, for example, groups of WTRUs may be pre-configured (for example, via dedicated RRC signaling) for a common grant less resource that may be accessed by WTRUs autonomously, groups of resources may be configured (for example, via an access table) for contention based access that may be accessed by all WTRUs in the cell, groups of resources may be configured (for example, via downlink control information) for scheduled access that may be accessed only by WTRUs that have a valid WTRU specific scheduling grant.

For the assistance aspect, the WTRU may perform initial access on an assisted carrier/cell/cell group/slice/SOM based on assistance information received from assistance carrier/cell/cell group/slice/SOM. Such assistance information includes one or more characteristics of the access method described above.

Various access methods may be performed by the WTRU.

One example access method includes the WTRU transmitting data on a contention based data channel. The first uplink message from the WTRU (for example, msg1) may carry a whole data PDU or portions of it. The WTRU may also transmit a demodulation reference signals, preambles, and/or the WTRU identity along with msg1. The WTRU may choose the demodulation reference signal from a pool of available sequences. Alternatively, the WTRU may choose the demodulation reference signal as a function of the WTRU identity. In another embodiment, the WTRU may be configured with a unique demodulation reference signal and/or an explicit WTRU identity. The WTRU may receive an acknowledgement from the network which includes one or more of the following: a reference to the UL data PDU (for example, time/frequency resource occupied by the data PDU), demodulation reference signal sequence used in the UL PDU, WTRU ID included in the data PDU, etc.

A second example access method is based on multi-point random access as described above. Other example access methods may include but are not limited to: beamformed random access for above 6 GHz, access methods specific to coverage enhanced WTRUs using repetition, asynchronous access method with relaxed synchronization requirements.

Configuration of diverse access methods may include one or more characteristics/properties/parameters listed above, including the resources to be used for the access method.

Figure 11:
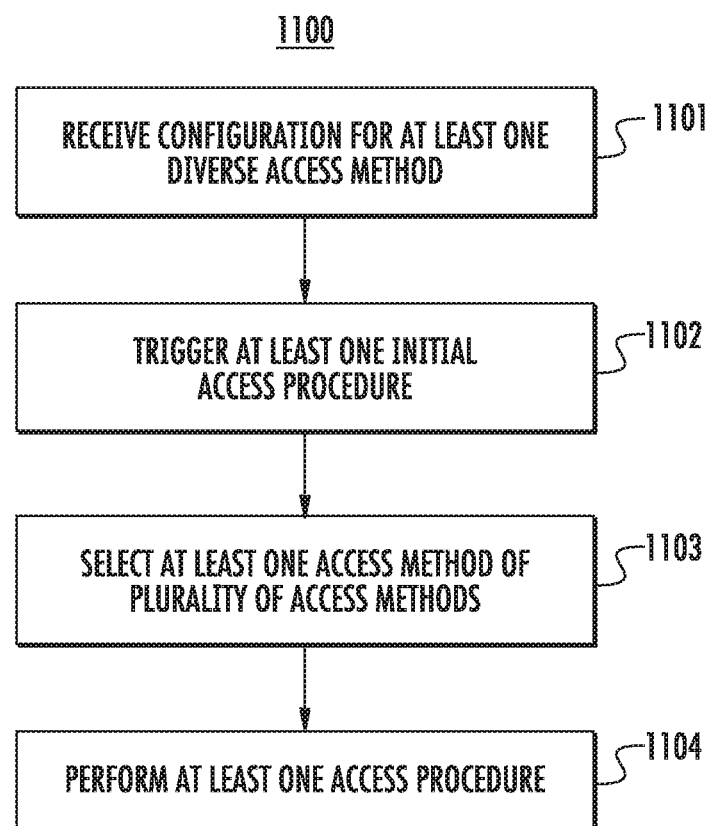
FIG. 11 is a flow diagram of an example procedure for configuration of diverse access methods.

FIG. 11 is a flow diagram of an example procedure 1100 for configuration of diverse access methods that may be performed in the example system 700 described above and used in combination with any of the embodiments described herein. While each step of the procedure 1100 in FIG. 11 is shown and described separately, multiple steps may be executed in a different order than what is shown, in parallel with each other, or concurrently with each other. The process of FIG. 11 is performed by a WTRU for exemplary purposes, but it may also be performed by any node operating in a wireless communications system such as a TRP, eNB, 5gNB, AP, or base station. In the example of FIG. 11, a WTRU, via the transceiver or receiver of the WTRU as described above, may receive a configuration for at least one diverse access method 1101. This reception of a at least one diverse access method 1101 may be achieved according to at least one of the following: via a default access method, a broadcasted configuration, a particular arrangement of system signatures, an access table, a dedicated configuration, an assisted configuration, and/or an implicit determination.

For example, a default access method may be pre-configured and the WTRU may use the default access method in the absence of any other configuration or until it has acquired any of the configurations described below.

A broadcasted configuration may include a list of allowed/possible access methods may be broadcasted e.g., using RRC msg (including system information messages), MAC control element (in a shared scheduling information on a common channel and/or initial access response message (for example, a RAR received during random access procedure)), master information block (which may include for example the initial access method used on a generic SOM/slice or when detailed access table is not yet acquired/available), system information broadcast (which may include access methods allowed in a specific SOM/slice which may or may not carry system information broadcast).

For using a particular arrangement of system signatures, a predefined signal sequence may be used and/or relative timing/frequency offset between such signals may be used (for example, an access method may be indicated and/or determined as a function of index associated with the sequence of broadcast signal and/or relative placement (in time/frequency) between the plurality of such signals).

A configuration for one or more access methods may be provided in the access table, which may be indexed by a system signature or a reserved value. For example, each access method may be associated with a different system signature, and such an association may additionally imply a mapping between a bandwidth region where the system signature is transmitted and the applicable access method within the associated bandwidth region. The WTRU may obtain the access table transmitted using a broadcast mechanism (for example, via a shared data channel) or using a dedicated channel (for example, as a WTRU specific RRC configuration).

For a dedicated configuration, the WTRU may be explicitly configured with one or more access methods/parameters using a control protocol (for example, RRC protocol), medium access protocol (for example, MAC control element or by means of RAR message during a random access procedure), a paging message may be used to indicate both a DL data arrival and the associated UL access method/parameters to use, a NAS message (for example, a WTRU may receive set of allowed access methods during attachment, and it may be a function of WTRU subscription), downlink control signaling (for example, by means of a DCI received, additionally the DCI may indicate the resources or slices where the access methods are applicable). The WTRU may prioritize the dedicated configuration over other configurations. For example, one or more parameters in the dedicated configuration may take precedence over parameters configured through other means.

For an assisted configuration, the WTRU may obtain the configuration for an access method from an assistance layer. Such a configuration may be provided via a RRC configuration or may be signaled using access table. For example an access method configuration for the small cell layer may be provided by a macro layer. In another example, the configuration for a beamformed small cell layer (operating for example above 6 GHz) may be provided by the assistance layer operating in the sub 6 GHz frequency.

For an implicit determination, the WTRU may implicitly identify one or more aspects of access method from the configuration of rest of the parameters. For example, the choice of multiple access method may be implicitly determined by the nature of resource allocation and/or parameterization of the UL resources.

Configuration aspects may include the information necessary for the WTRU to identify different access methods, select an appropriate access method (for example, information applicable to access method selection) and to perform access procedure. One or more configuration aspects of the access method may be static, whereas the others may be dynamic. In one example, the WTRU may combine parts of configurations signaled using different methods to obtain an overall configuration for an access method. For example, a choice of multiple access method may be signaled in a broadcast system information/access table, and the resources for the access method may be dynamically scheduled via a control channel. Additionally, the WTRU may obtain parts of the configuration from different nodes to determine the overall configuration for an access method. The WTRU may obtain assistance from a macro layer, combined with specific information from small cell layers to perform initial access on the small cell layer. The WTRU may receive a configuration of UL resources independent of the access methods. For example, a linkage may be provided between the UL resources and the access method to be used on that UL resource. In another example, a specific slice isolated from other slices may be reserved for initial access procedures.

Referring to FIG. 11, the WTRU may trigger at least one initial access procedure 1102. This step may be performed when one or more of the following conditions are satisfied:

There is an arrival of UL data and/or higher layer signaling (for example, RRC, NAS) and one or more of the following conditions are satisfied: when WTRU UL synchronization status is non-synchronized; data belongs to a logical channel or logical channel group for which no connection exists, irrespective of the status of other logical channels (for example, being active or inactive); data belongs to a new logical channel group or logical channel for which no transport channel mapping exists; data is for a different service than the services that are currently active; data belongs to the logical channel which is associated with a different mode/slice/SOM than the currently active logical channel; data on the LCH is configured to be transmitted to a TRP for which WTRU doesn't have UL synchronization; data is for which no defined configuration/i.e. radio bearers or logical channels exist; and data is mapped to a different layer or RAT or component carrier or cell group than the currently active layer/RAT/component carrier or cell group.

There is DL data arrival and one or more of the following conditions are satisfied: the WTRU receives a paging message or a signal indicating DL data arrival and the paging message may additionally indicate a new logical channel/transport channel configuration; there is an explicit indication in a paging message to trigger a specific access method, which may be on a specific SOM and/or slice; and for example, the DL paging message may indicate DL data arrival, along with either a logical channel identity and/or mapping to a specific transport channel type and/or explicit indication of initial access method.

There are aspects related to new or unknown system signatures: the WTRU may be preconfigured to detect new signatures and trigger a report to the network. Reception of an unknown system signature for which no valid entry in the access table exists may occur, for example, when a TRP transitions from an OFF state to ON state, or when a new slice or SOM is instantiated and a system signature specific to that slice/SOM is transmitted. Alternatively, the WTRU may view unknown signatures simply as a non-accessible transmission point or slice or SOM.

The L3 is re-established (for example, RRC connection): for example, the L3 may be re-established due to a failure such as a radio link failure, handover failure, or security failure. The WTRU may be configured to initiate an access procedure for the purposes of reporting the invalid configuration and/or to resume the data transfer. For example, when the WTRU may be unable to comply with one or more aspects of a configuration received in access table or higher layer message (for example, L3) or MAC Control element or any other means.

An initial access procedure is triggered by mobility of the WTRU: for example, an initial access procedure may be triggered when the WTRU moves into a new RAN routing area that is different from the previous area or not included in the previous RAN routing area group, or a change of RAN routing area, TRPG or RAN central unit and handover.

There are aspects related to UL synchronization and timing advance: the WTRU may lose UL synchronization (for example, the WTRU may be required to maintain UL synchronization for low latency transfer); for positioning purposes, when timing advance is needed for WTRU positioning; and time elapsed, periodic such as when WTRU enters DRX but still needs to maintain UL synchronization.

In the case of LTE-assisted 5gFLEX transport channels: the WTRU monitors preconfigured time/frequency resources within LTE Uu for 5GFlex operation. The WTRU may trigger initial access when it detects one or more system signatures and/or when the received power of the system signatures is above a threshold in the resources configured for 5GFlex operation.

The WTRU receives an explicit order from the network (for example, when the network orders the WTRU to transition from asynchronous access to synchronous access, PDCCH order, and/or network triggered initial access (for example to retrieve unknown WTRU context)).

The WTRU changes coverage status: including moving back to in-coverage from out-of-coverage, when the serving cell quality drops below a threshold, and when WTRU enters enhanced coverage mode. The WTRU may initiate initial access corresponding to enhanced coverage mode (for example, repetition of RACH preambles).

The WTRU is unable to acquire access table within time elapsed: for example, the WTRU may use a default access method on a low periodic resource that may be a function of system signature.

The WTRU triggers at least one access procedure upon power up.

The WTRU triggers at least one access procedure upon activation of UL resources corresponding to a different access method: including when a new slice or SOM is activated and one or more UL resources in the slice/SOM is reserved for initial access. The WTRU may perform the initial access method associated and/or configured for that SOM or slice. When a new component carrier (for example, in case of carrier aggregation) or when a small cell is added (for example, in case of multi-connectivity), the WTRU may trigger the initial access method configured for that carrier or small cell, etc. For example, when above 6 GHz carrier is activated, the WTRU may then perform initial access (for example, beamformed initial access) specific to that carrier.

There is a trigger to a new/secondary access method as an outcome of the primary access method or failure of the previous access method. Triggers may be specific to D2D or relay mode.

Referring to FIG. 11, the WTRU may select at least one access method of a plurality of access methods 1103. This selection may be according to various selection criteria. WTRU may determine the UL resources associated with and configured for the selected access method. WTRU may then perform the at least one access procedure 1104. This may be performed according to the rules defined for the access method.

The selection criteria used to select the at least one access method may include but is not limited to the following: as a function of a logical channel type for which data becomes available; based on the outcome of a previous initial access procedure; based on the outcome of a primary initial access procedure; as a function of a size of the data PDU; as a function of a type of the data PDU (for example, IP or non-IP data); as a function of the service request type; as a function of the existing LCH connections/link; a type of connection; as a function of an access class; as a function of the radio interface; as a function of signal structure, SOM, or bandwidth region; as a function of slice; as a function of Type of Service/QoS; as a function of TRP cell group specific, TRP specific, TRPG specific; as a function of a layer; a configuration aspect; based on resource selection; generic access methods and specific access methods; as a function of a received system signature; as a function of the capability and/or subscription of the WTRU; based on the coverage status of the WTRU; based on a function of the operation mode; based on more than one initial access procedure in parallel.

For a function of logical channel type for which data becomes available, different types of radio bearer and/or logical channels and/or logical connections, logical channel groups and/or transport channels and a mapping between them may be defined to characterize different types of end to end service (for example, eMBB, URLLC, or mMTC) to be supported by the 5GFlex. Each logical channel and/or transport channel may be associated with one or more access methods. Upon arrival of data for an empty logical channel, the WTRU may first select one (if more than one exist) and then perform the initial access procedure associated with that LCH.

When based on the outcome of a previous initial access procedure, the WTRU may maintain a count of number of failures with a particular access method. The WTRU may switch to a different access method when the number of failures exceeds a predefined threshold. Additionally, the failed access method may be barred for a predefined time specified, for example, via a prohibit timer. The WTRU may retry a failed access method with different parameters (including but not limited to power ramp, increased repetition, and different resources reserved/prioritized for colliding WTRUs (for example, some dedicated resources)). The WTRU may declare a radio link failure when all or a set of initial access methods or a counter across all access methods exceeds a threshold or when a predefined time elapses from the start of the initial access procedure.

The selection may be based on the outcome of a primary initial access procedure, for example, when the primary initial access procedure provides more information about the secondary initial access procedure. There may be a redirection to another in case of SOM.

The selection may be a function of existing LCH connections/links. For example, upon arrival of data in a new LCH the WTRU may use specific methods corresponding to the current active LCH, TCH, slice, SOM (for example, using current UL control channel).

The selection may be based on type of connection. The WTRU may be configured to perform a connection based data transfer or a connectionless data transfer, for example, based on a size of the data PDU, latency, and/or overhead requirements. The WTRU may select different access methods associated with the nature of the connection. For example, the connection may be based on a random access procedure for a connection oriented data transfer, a contention based data transfer procedure for connectionless data transfer, an establishment cause (MO signaling or MO data), re-establishment or establishment, high priority access, delay tolerant access, emergency connection, etc.

The selection may be a function of an access class. The WTRU may select different access methods based on an access class, and some of the access methods may be restricted for certain access classes.

The WTRU may select the access method as a function of the radio interface. For example, different access methods may be defined for LTE, LTEE$_{VO}$, 5GFlex below 6 GHz, and 5GFlex above 6 GHz. The WTRU may select one access method out of possible access methods for each of the radio interfaces. The WTRU may prioritize selection of radio interfaces based on an allowed access method that meets one or more requirements in terms of latency and/or overhead.

The selection may be a function of the signal structure, SOM, or bandwidth region. There may be a set of allowed resources within the SOM. The WTRU may select a SOM and then perform access method associated with it.

The selection may be a function of slice (type of slice). The WTRU may perform an initial access method on a particular slice according to the type of service provided by the slice (function of system signature).

The selection may be a function of a layer. The access method may also be determined from a property associated with the node, such as an indication of a layer.

The selection may be based on a configuration aspect. For example, the WTRU may be configured with a specific access method for the DL data arrival in the DL paging message. The WTRU may trigger the configured access method to use in the target cell upon handover.

The selection may be based on resource selection. The WTRU may determine the access method based on, for example, the UL resource selection. The WTRU may select an earliest occurring UL resource and then select the access method associated/configured for that resource. Among the available access methods, WTRU may choose one as a function of its reducing latency aspect. The WTRU may compare the scheduling periodicity of different access methods/resources and select the earliest or one with least overhead, etc.

The selection may be based on a generic access method and/or a specific access method. The WTRU may first select a default access method configured for/associated with a generic SOM/slice/preferred cells/RATs and subsequently perform specific access methods associated with other SOMs/slices/cells/cell groups/RATs. The specific access methods may be configured/activated as a result of default access method. In one solution the default access method may be cell specific, and the specific access method may be WTRU specific. For example, there may be a distinction between the initial access using the nominal bandwidth (for example, power on, obtaining PDP context, etc.) and an initial access for a specific SOM, which may be associated with a given signature. Some eNBs/TRPs may support only one, the other, or both. For example, a macro eNB may support access using a nominal SOM, while TRPs may support only SOM-specific access (no means to exchange L3/NAS signaling), while others (eNBs or TRPs) may support both.

The selection may be a function of a received system signature. The WTRU may select the initial access method associated with/configured for the received system signature. For example, when the WTRU receives multiple system signatures, the WTRU may select the initial access method associated with the system signatures of a highest received power or preferred type of system signature.

The selection may be based on coverage status of the WTRU, which may include in-coverage, out of coverage, enhanced coverage, etc. Function of operation mode may include different access methods based on whether the operating mode is infrastructure mode, D2D mode, relay mode or transport (for example, self-backhaul/fronthaul) mode. More than one initial access procedure may be used in parallel.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, AP, eNB, 5gNB, terminal, base station, RNC, or any host computer.

What is claimed is:

1. A wireless transmit/receive unit (WTRU) comprising:
a processor; and
a transceiver;
the processor and the transceiver configured to receive a transmission including system information indicating a random access channel (RACH) configuration, wherein the RACH configuration indicates one or more RACH occasions and one or more preambles, each of the RACH occasions associated with at least one of the one or more preambles;
the processor and the transceiver configured to receive one or more reference signals; and
the processor and the transceiver configured to transmit one of the preambles in one of the one or more RACH occasions that is associated with the transmitted preamble, wherein the transmitted preamble is selected for transmission based on a measurement of the received one or more reference signals, and wherein the transmitted preamble is transmitted using beamforming parameters derived based on the received one or more reference signals.

2. The WTRU of claim 1, the processor and the transceiver configured to:
  transmit the one of the one or more preambles along with one or more protocol data units (PDUs); and
  receive a random access response (RAR) that is responsive to the transmitted preamble and the one or more PDUs.

3. The WTRU of claim 1, the processor and the transceiver configured to receive a random access response (RAR) that is responsive to the transmitted preamble, wherein the RAR includes information indicating an uplink grant; and
  the processor and the transceiver configured to transmit one or more protocol data units (PDUs) using resources configured via the uplink grant.

4. The WTRU of claim 3, the processor and the transceiver configured to receive a message including information indicating an identifier of the WTRU that was included in the transmitted one or more PDUs.

5. The WTRU of claim 1, the processor and the transceiver configured to receive a random access response (RAR) within a time window associated with the RACH configuration.

6. The WTRU of claim 1, wherein the each of the one or more preambles indicated by the RACH configuration has a length associated with a subcarrier spacing that is utilized in accordance with a spectrum operation mode.

7. The WTRU of claim 1, wherein the RACH configuration includes an indication of a subcarrier spacing to be used by the WTRU for transmission of the transmitted preamble.

8. The WTRU of claim 1, the processor and the transceiver configured to utilize a plurality of uplink carriers, wherein the transmitted preamble is transmitted using a first one of the plurality of uplink carriers or using a second one of the plurality of uplink carriers based on the measurement of the received one or more reference signals.

9. The WTRU of claim 1, wherein, in accordance with the derived beamforming parameters, the transmitted preamble bears a spatial relationship with one of the received one or more reference signals.

10. The WTRU of claim 1, wherein the one of the one or more RACH occasions defines a time domain resource associated with one of the received one or more reference signals.

11. A method performed wireless transmit/receive unit (WTRU), the method comprising:
  receiving a transmission including system information indicating a random access channel (RACH) configuration, wherein the RACH configuration indicates one or more RACH occasions and one or more preambles, each of the RACH occasions associated with at least one of the one or more preambles;
  receiving one or more reference signals; and
  transmitting one of the preambles in one of the one or more RACH occasions that is associated with the transmitted preamble, wherein the transmitted preamble is selected for transmission based on a measurement of the received one or more reference signals, and wherein the transmitted preamble is transmitted using beamforming parameters derived based on the received one or more reference signals.

12. The method of claim 11 further comprising transmitting the one of the one or more preambles along with one or more protocol data units (PDUs); and
  receive a random access response (RAR) that is responsive to the transmitted preamble and the one or more PDUs.

13. The method of claim 11 further comprising receiving a random access response (RAR) that is responsive to the transmitted preamble, wherein the RAR includes information indicating an uplink grant; and
  transmitting one or more protocol data units (PDUs) using resources configured via the uplink grant.

14. The method of claim 13 further comprising receiving a message including information indicating an identifier of the WTRU that was included in the transmitted one or more PDUs.

15. The method of claim 11, further comprising receiving a random access response (RAR) within a time window associated with the RACH configuration.

16. The method of claim 11, wherein the each of the one or more preambles indicated by the RACH configuration has a length associated with a subcarrier spacing that is utilized in accordance with a spectrum operation mode.

17. The method of claim 11, wherein the RACH configuration includes an indication of a subcarrier spacing to be used by the WTRU for transmission of the transmitted preamble.

18. The method of claim 11, wherein the WTRU is configured to utilize a plurality of uplink carriers, and wherein the transmitted preamble is transmitted using a first one of the plurality of uplink carriers or using a second one of the plurality of uplink carriers based on the measurement of the received one or more reference signals.

19. The method of claim 11, wherein, in accordance with the derived beamforming parameters, the transmitted preamble bears a spatial relationship with one of the received one or more reference signals.

20. The method of claim 11, wherein the one of the one or more RACH occasions defines a time domain resource associated with one of the received one or more reference signals.

* * * * *